US011858733B2

(12) United States Patent
McConnell et al.

(10) Patent No.: US 11,858,733 B2
(45) Date of Patent: Jan. 2, 2024

(54) WASTE DISPOSAL SYSTEM HAVING A MANUAL ACTUATOR AND A ROTATOR

(71) Applicant: 1316 LLC, Las Vegas, NV (US)

(72) Inventors: Thomas E. McConnell, Santa Ynez, CA (US); Yafei Lu, Suzhou (CN); Qianqian Wang, Suzhou (CN)

(73) Assignee: 1316 LLC, Las Vegas, NV (US)

( * ) Notice: Subject to any disclaimer, the term of this patent is extended or adjusted under 35 U.S.C. 154(b) by 52 days.

(21) Appl. No.: 17/233,445

(22) Filed: Apr. 17, 2021

(65) Prior Publication Data

US 2022/0332499 A1 Oct. 20, 2022

(51) Int. Cl.
*B65B 9/10* (2006.01)
*B65F 1/16* (2006.01)
*B65F 1/06* (2006.01)

(52) U.S. Cl.
CPC ............ *B65F 1/1615* (2013.01); *B65F 1/068* (2013.01); *B65F 1/1607* (2013.01); *B65F 2001/1676* (2013.01); *B65F 2210/129* (2013.01)

(58) Field of Classification Search
CPC ...... B65F 1/1615; B65F 1/068; B65F 1/1607; B65F 2001/1676; B65F 2210/129
USPC ....... 220/908.1, 908, 495.08, 495.06, 495.05
See application file for complete search history.

(56) References Cited

U.S. PATENT DOCUMENTS

| | | | | |
|---|---|---|---|---|
| 2005/0166553 | A1* | 8/2005 | Knuth | B65F 1/062 53/469 |
| 2016/0060026 | A1* | 3/2016 | McConnell | B65F 1/06 220/495.08 |
| 2016/0167874 | A1* | 6/2016 | Dunn | B65F 1/062 220/495.05 |

* cited by examiner

*Primary Examiner* — John K Fristoe, Jr.
*Assistant Examiner* — Elizabeth J Volz
(74) *Attorney, Agent, or Firm* — WPAT LAW, P.C.; Anthony King

(57) ABSTRACT

A waste pail having a manual actuator to indirectly turn a rotator, both of which are enclosed in a lid casing. The rotator rotates the inner collar of the waste pail, and the inner collar is attached to the top rim of a trash bag. A user may twist the trash bag open only when the lid casing is closed, thereby preventing the escape of odor from within the trash bag.

14 Claims, 51 Drawing Sheets

WASTE DISPOSAL SYSTEM HAVING A MANUAL ACTUATOR AND A ROTATOR

FIELD OF THE DISCLOSURE

The present disclosure relates to a waste disposal system, more particularly, a waste pail with a replaceable waste bag suitable for various types of solid waste, including cat litter and soiled diapers.

BACKGROUND OF THE DISCLOSURE

Generally, a waste pail is a garbage can for receiving and holding waste articles. There have been various efforts to design a waste pail to keep odor from escaping the waste pail. For example, many waste pails have a pivoting top lid so that odor is kept within the waste pail.

These known designs, however, still expose a user to odor escaping from the inside of the waste pail when the user opens the lid.

Also, many known designs of waste pails use a foot pedal mechanism to open the lid. A waste pail having a foot pedal requires that it be placed at a location with sufficient clearance around the foot pedal so a user may access the foot pedal. Also, foot pedals are not user-friendly for younger children and foot pedals can be aesthetically unpleasing.

There is a continuing need for new ways to hold and receive solid waste within a waste pail to minimize the escape of odor during the placement of the waste article into the waste pail.

There is also a continuing need for new ways to operate a waste pail satisfying at least one or more of the above-mentioned needs.

All referenced patents, applications and literatures are incorporated herein by reference in their entireties. Furthermore, where a definition or use of a term in a reference, which is incorporated by reference herein, is inconsistent or contrary to the definition of that term provided herein, the definition of that term provided herein applies and the definition of that term in the reference does not apply. Although the present embodiments may obviate one or more of the above-mentioned needs, some aspects of the embodiments might not necessarily obviate them.

BRIEF SUMMARY OF THE DISCLOSURE

In a general implementation, the contemplated waste disposal pail can have a bottom drum and a top drum. The bottom drum holds a waste bag/liner while the top drum contains necessary mechanism to control a rotational movement of a collar which is placed over the top opening of the bottom drum.

In one implementation, the top drum can include a lid casing and a manual actuator. The manual actuator can be located on the top side of the lid casing to indirectly control the rotational movement of the collar. The manual actuator can have a vertical movement (e.g., push button) or a rotational movement (e.g., a turn knob or turn dial).

The manual actuator can either directly or indirectly cause a rotator to rotate. The rotator can also be disposed within the lid casing or under the lid casing to make direct or indirect engagement with the collar. There can also be at least two gears disposed within the lid casing to transfer motion and power between the manual actuator and the rotator. The optional gears can also be of different sizes to provide a mechanical advantage which allows for an improved speed and/or torque of the rotator.

In another aspect combinable with the general implementation, the lid casing of the top drum can be transparent or semi-transparent to show movement of any internal components such as gears.

In another aspect combinable with the general implementation, when the lid casing is closed, the rotator underneath the lid casing either directly or indirectly (e.g., via a lid insert) engages with the rotatable collar such that when the rotator rotates, the collar also rotates.

In another aspect combinable with the general implementation, the top lid can be pivotably coupled to the bottom drum via a hinge, but this disclosure is not limited thereto.

In another aspect combinable with the general implementation, an optional lid insert can be provided between the rotator and the collar. The lid insert can have a funnel shape to contain the waste article before the waste article can drop into the inside of the waste bag.

In another aspect combinable with the general implementation, the manual actuator can control the rotational movement of the collar only when the lid casing is closed onto the bottom drum. Therefore, a user may not be able to use the manual actuator to untwist the neck of the waste bag until the lid casing is closed. In this way, nuisance garbage odor from inside the waste bag is prevented from wafting towards the user.

In another aspect combinable with the general implementation, the lid insert can be pivotably coupled to the collar via a hinge.

In another aspect combinable with the general implementation, the top rim of the waste bag can be anchored to the rotatable collar which fits over the bottom drum.

In another aspect combinable with the general implementation, a part of the waste bag can be anchored to the bottom drum such that when the collar rotates relative to the bottom drum, waste bag is caused to twist at its neck region, effectively sealing off the odor-causing articles within the waste bag.

In another aspect combinable with the general implementation, the bag frame of the waste bag can be foldable and can have several tabs. Each of the tabs can have an aperture for fitting over the engagers of the inner drum. The tab can also have a notch to keep a twisted neck of the waste bag closed when carrying out the waste bag.

In another aspect combinable with the general implementation, the waste bag can have at least one tether or strap to fasten to the inner wall of the bottom drum. In this way, when the top rim of the waste bag rotates with the collar, the tether or the strap twists around a neck of the waste bag. In another embodiment, the tether or the strap causes a neck of the waste bag to twist into a twisted configuration.

In another aspect combinable with the general implementation, the tether of the waste bag can be attached to a mid-portion of the waste bag such that when the neck of the waste bag is twisted, a funnel shape can be formed above the twisted neck of the waste bag.

In another aspect combinable with the general implementation, the tether of the waste bag can be attached near the top rim of the waste bag.

In another aspect combinable with the general implementation, the bottom drum can be easily disassembled. For example, to remove a heavy bag of cat litter from the bottom drum, a user may first twist off a top half portion of the bottom drum thereby making it easier to pull the bag of cat litter out of the bottom drum.

In another aspect combinable with the general implementation, the various part of the waste pail can be easily assembled by an end consumer, thereby allowing the waste pail to be shipped in disassembled parts nestled into a much smaller dimension.

In another aspect combinable with the general implementation, the bottom container can have two sections physically separable from each other. One of the sections can be replaced with a shorter section to create a smaller waste pail for certain special uses such as disposal of cat litter.

In a general implementation, the current disclosure provides a novel method of operating a waste management. The novel method includes keeping a portion of the waste bag tethered to an interior wall of the bottom drum while anchoring the top rim of the waste bag to a rotatable collar. The neck portion of the waste bag can be twisted/untwisted by rotating the collar.

In another aspect combinable with the general implementation, the novel method includes priming the waste bag by manually rotating the collar first to effectively twist a neck of the waste bag prior to use.

The details of one or more implementations of the subject matter described in this disclosure are set forth in the accompanying drawings and the description below. Other features, aspects, and advantages of the subject matter will become apparent from the description, the drawings, and the claims. Certain features that are described in this specification in the context of separate implementations can also be implemented in combination in a single implementation. Conversely, various features that are described in the context of a single implementation can also be implemented in multiple implementations separately or in any suitable subcombination.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the invention as defined in the claims. It is expressly understood that the embodiments as defined by the claims may be broader than the illustrated embodiments described below.

As used herein, the term “co-axial” in conjunction with inner components within the lid casing refers to a relative position of component and does not infer whether or not the two components are physically connected by the same axle/shaft. For example, when a first gear and a second gear are described as being co-axial, it means both of these two gears rotate on the same rotational axis, but not necessarily physically connected to the same axle/shaft. In other words, their rotational axes align. When a first gear and a second gear are described as being not co-axial, that means their rotational axes do not align.

Basic Components

In one aspect of the embodiment, this disclosure is related to an apparatus for a novel method of managing waste. The apparatus is contemplated to be a waste pail that can receive and store various types of waste articles. For example, this can be a waste pail specific for soiled diapers or cat litter. Other types of waste articles are also specifically contemplated, especially odorous waste articles.

Figure 1:
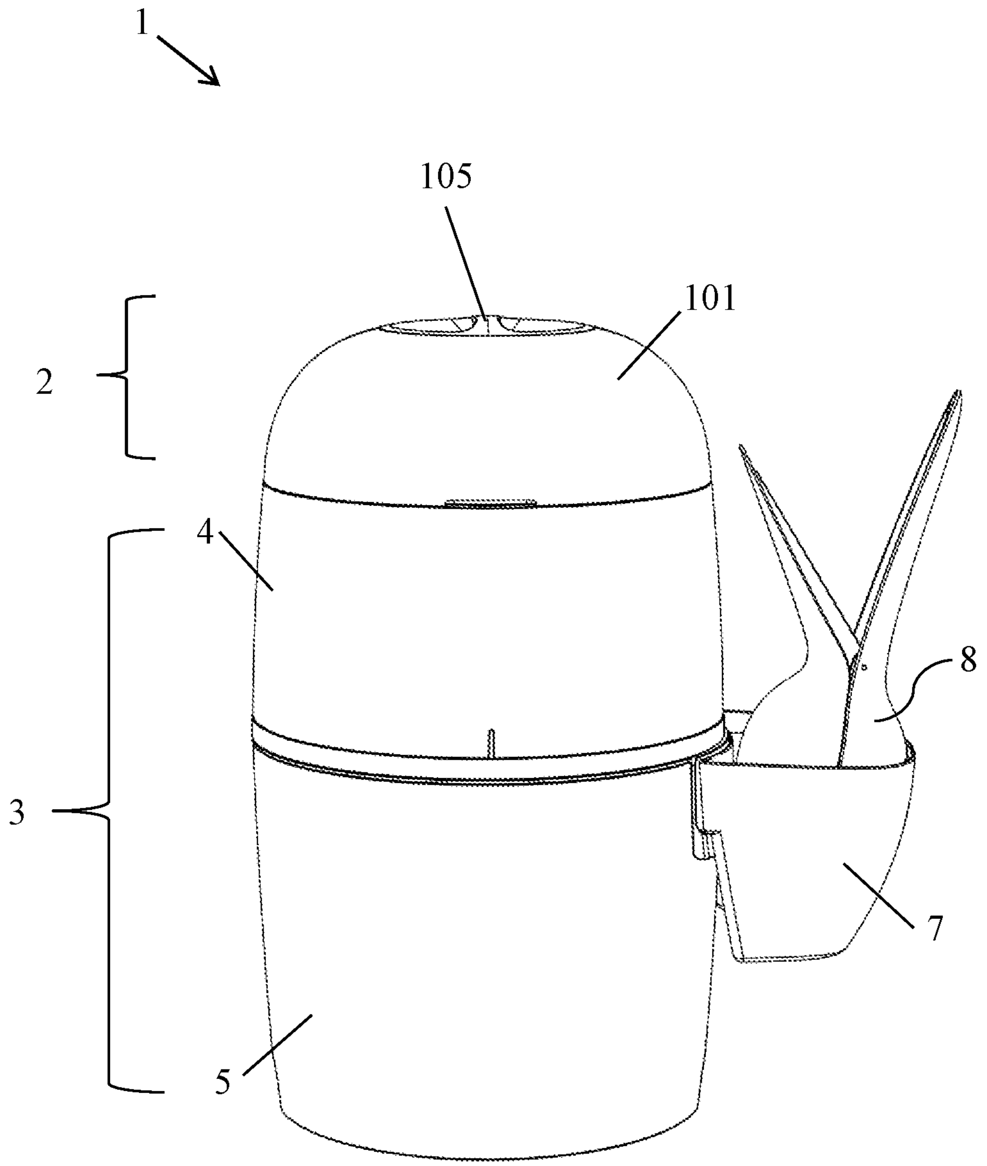
FIG. 1 is a perspective view of an embodiment of a contemplated waste pail according to an aspect of the embodiment.

Referring now to FIG. 1, the basic structure of the contemplated waste pail 1 can include a top drum 2 to fit over a bottom drum 3. The top drum 2 can have a lid casing 101 that encloses various components all of which will be described in more detail below. In this embodiment shown in FIG. 1, there is a turn knob 105 at the top of the lid casing 101.

The bottom drum 3 can be a barrel shaped container with an empty enclosure within which a waste bag/liner can be enclosed. The waste bag/liner will be described in more detail below.

There can be an optional scoop 8 with a scoop holder 7 which can attach to any part of the bottom drum 3. The scoop 8 can be particularly useful if the waste pail is being used to hold cat litter.

The bottom drum 3 can be of a single-piece construction in one embodiment. In another embodiment, such as the one shown in FIG. 1, the bottom drum 3 can come in two separable pieces. Here, bottom drum 3 has an upper portion 4 detachably attached to a lower portion 5. Upper portion 4 may connect to the lower portion 5 using any known mechanical means. The upper portion 4 may clip onto the lower portion 5, or they may twist/screw onto each other. There can also be fasteners to detachably attached the two pieces together.

Figure 2:
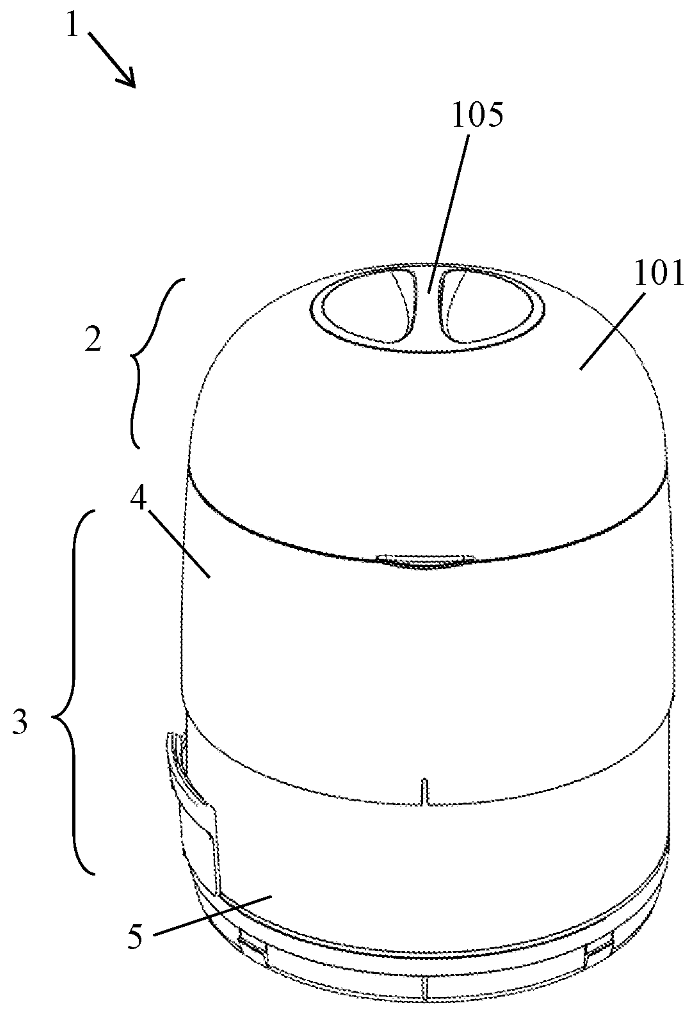
FIG. 2 is a perspective view of the contemplated waste pail of FIG. 1 having disassembled parts nestled together into a smaller profile for shipping, according to an aspect of the embodiment.

One embodiment provides a lower portion 5 having a slightly tapered bottom end such that its bottom end has a smaller dimension such that it is small enough to fit partially or fully within the upper portion 4 during storage and shipping. FIG. 2 shows the waste pail 1 with a smaller profile made possible by turning the lower portion 5 upside down and then fit the upper portion 4 over it. In this Figure, the lower portion 5 is nestled partially within the upper portion 4. This novel method advantageously lowers packaging and shipping costs.

The two-piece configuration can also be helpful especially when taking a bag of cat litter out of the bottom drum 3. A user may twist to easily unlock and remove the upper portion 4 from the lower portion 5. In this way, the bag of cat litter can be pulled out without accidentally tearing the bag.

Collar

Figure 3:
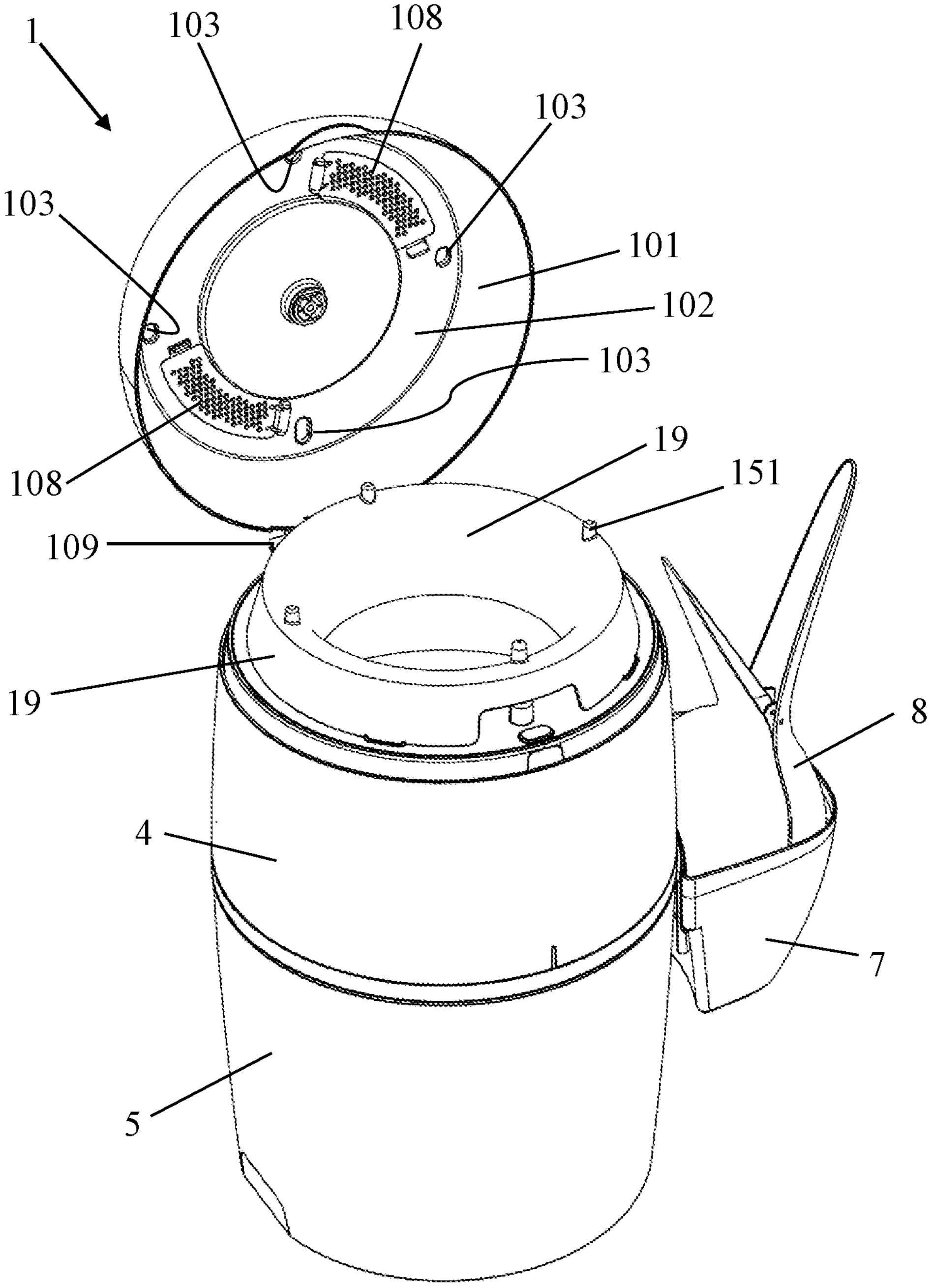
FIG. 3 is a perspective view of another embodiment of a contemplated waste pail having a lid insert, according to an aspect of the embodiment.

Referring now to FIG. 3, the lid casing 101 can be pivotably attached to the bottom drum 2 via an outer hinge 109. A user can manually lift the lid casing 101, revealing what is underneath the lid casing 101 thereby showing what is on top of the bottom drum 2.

Under the lid casing 101 there can be a rotator 102 which has apertures that function as catchers 103. There can be one or more deodorizers 108 disposed on the rotator 102. The deodorizer 108 can have a perforated door that can open to reveal a compartment to hold charcoal packets, other odor absorbing sachet, deodorizing pouches, or scented packets. The perforated door can be hinged to the rotator 102; the perforated door can clip and lock into position. The function and mechanical detail of the rotator 102 will be described in more detail later.

Directly disposed on top of the upper portion 4 of the bottom drum 3 is an optional lid insert 19. The lid insert 19 can have a generally funnel-shape; the lid insert 19 can guide the entry of waste articles down into the waste bag. The lid insert 19 can be particularly helpful to keep the waste article, e.g., cat litter, from spilling over.

Figure 4:
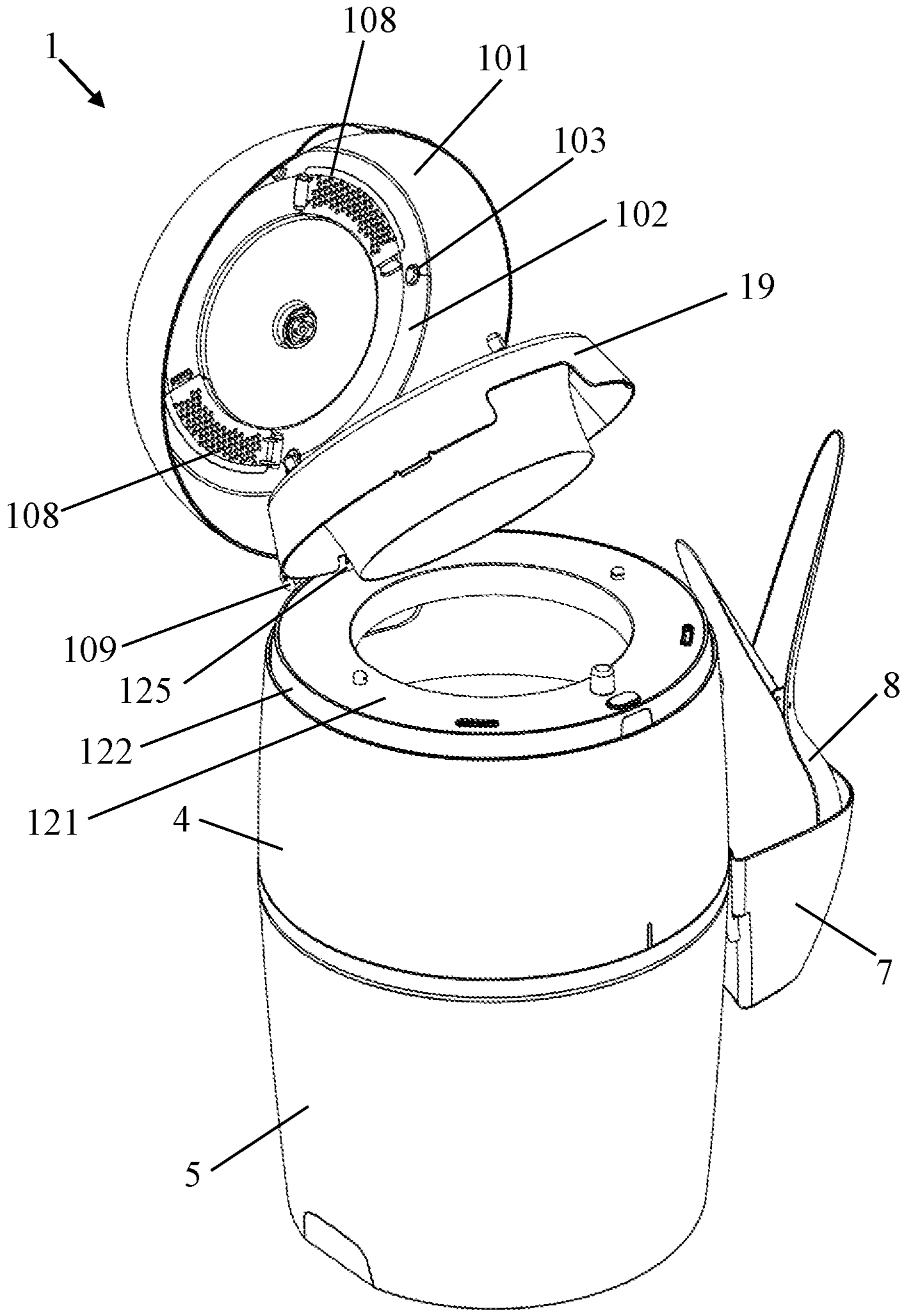
FIG. 4 is a perspective view of the contemplated waste pail of FIG. 3 with the lid insert halfway pivoted open, according to an aspect of the embodiment.

The lid insert 19 can be easily moved out of the way when installing a waste bag into the bottom drum 3. In FIG. 4, lid insert 19 is shown to be pivotably attached to the inner collar 121 via the inner hinge 125. In this way, a user can manually lift the lid insert 19 thereby revealing the inner collar 121 to which a waste bag (not yet installed in this Figure) can be attached. The lid insert 19 can be attached to the waste pail 1 in other ways. For example, it can matingly fit over the inner collar 121 without the inner hinge 125. In this way, a user can completely remove the lid insert 19 away from the inner collar 121. In such an embodiment, there can be mating couplers between the lid insert 19 and the inner collar 121 to aid in their coupling.

Figure 5:
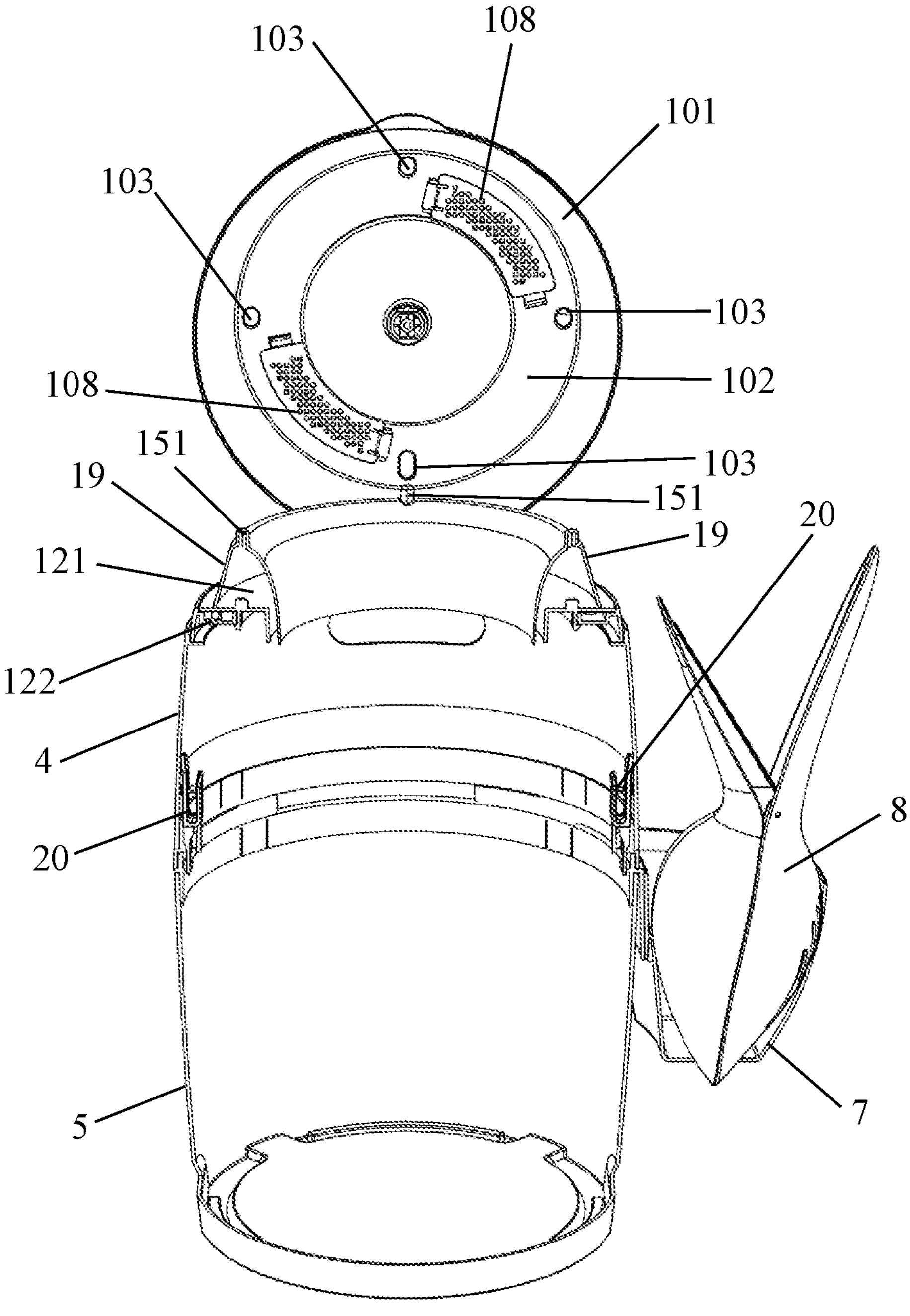
FIG. 5 is a cross-sectional view of the contemplated waste pail of FIG. 3, according to an aspect of the embodiment.
Figure 6:
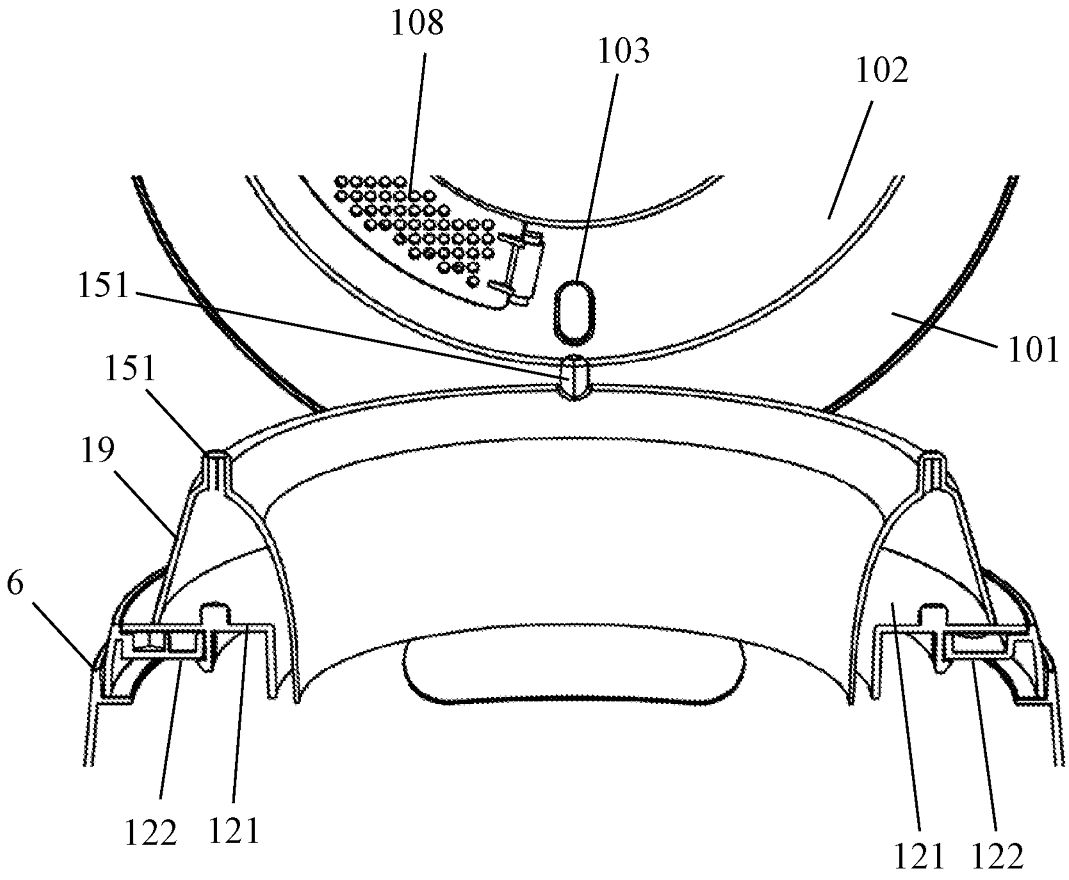
FIG. 6 is a close-up view of the lid insert shown in FIG. 3, according to an aspect of the embodiment.

FIGS. 5 and 6 illustrate the working relationship of lid insert 19, inner collar 121, and outer collar 122. The lid insert 19 can be a hollow structure having protuberances 151 disposed along its top ridge. These protuberances 151 can couple to the corresponding catchers 103 of the rotator 102. In the embodiment where the lid insert 19 is coupled to the inner collar 121 via an inner hinge 125, the lid insert 19 cannot rotate independently of the inner collar 121. In other words, when the lid insert 19 rotates, the inner collar 121 also rotates.

Although the protuberances 151 are each shown as a stubby protrusion, there can be other types of structure in other shapes and sizes to achieve the same function.

Inner collar 121 fits over the outer collar 122 in a track and groove mechanism such that the inner collar 121 can freely rotate relative to a stationary outer collar 122. The outer collar 122 is fastened (e.g., by friction, screw blade, clip, etc.) to the top rim 6 of the upper portion 4 of the bottom drum. In another embodiment, the outer collar 122 can be pivotably coupled to the top rim 6 of the upper portion 4 of the bottom drum via the outer hinge 109. In this way, a user may pivot open (i.e., tilt back) the inner collar 121 and outer collar 122 together, thereby providing easier access to the interior of the bottom drum 3. A user may pivot open the lid casing 101, inner collar 121 and outer collar 122 together at once, because these three parts can all be pivoted on the outer hinge 109. To install a new waste bag 10, a user may first pivot open the inner collar 121 and outer collar 122. The entire waste bag 10 can then be dropped into the interior of the bottom drum 3. The user can then close down the inner collar 121 and outer collar 122 while manually taking the bag frame 12 of the waste bag 10 and pass it through the circular opening of the inner collar 121 and outer collar 122.

In operation, the outer collar 122 remains stationary while the inner collar 121 can rotate along with the lid insert 19. As will be described later in association with FIG. 19, there can be an embodiment of the waste pail 1 without the optional lid insert 19.

Waste Bag/Liner

Figure 7:
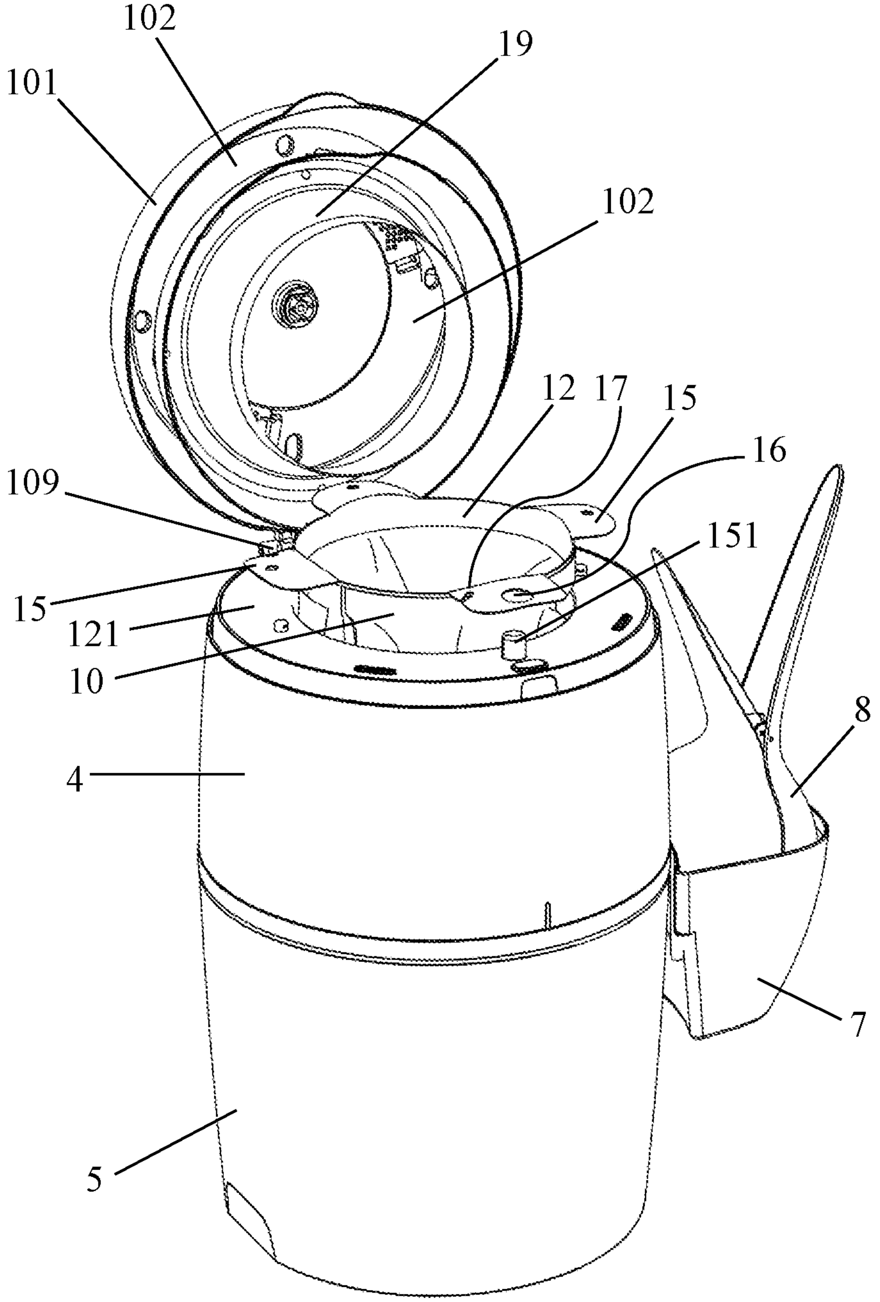
FIG. 7 is a perspective view of the contemplated waste pail of FIG. 4 with the lid insert fully pivoted open and a waste bag being placed into the bottom drum, according to an aspect of the embodiment.
Figure 8:
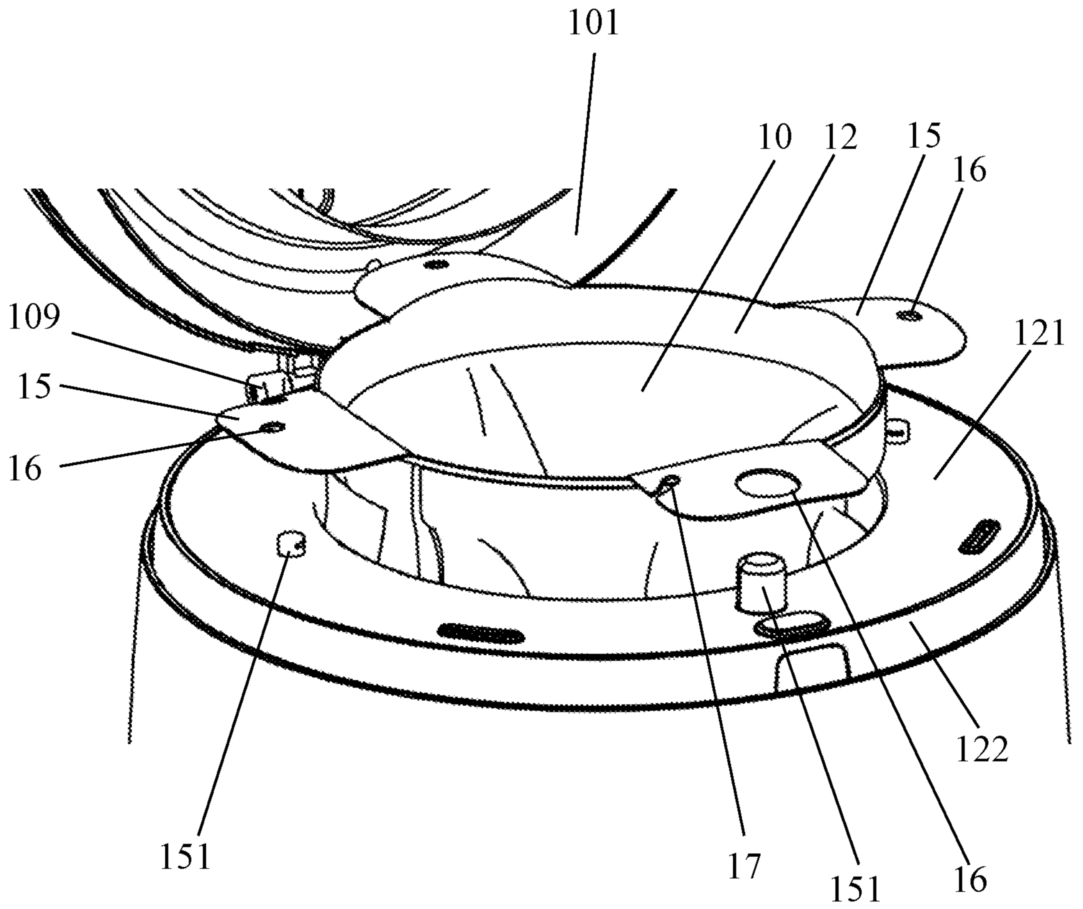
FIG. 8 is a close-up view of the bag frame of the waste bag as shown in FIG. 7, according to an aspect of the embodiment.

Referring now to FIGS. 7 and 8, a waste bag 10 can be provided in the bottom drum 3. Here, the waste bag 10 is shown partially inserted into the bottom drum 3 with its bag frame 12 yet to be secured to the inner collar 121. The bag frame 12 lines the opening of the waste bag 10. In other words, the top rim of the waste bag 10 can have a retaining feature so that the top rim of the waste bag 10 can be secured to the inner collar 121. The bag frame 12 can be made of various types of material such as plastic, rubber, and paper. The bag frame 12 can be flexible or foldable so that if needed, it can be entirely inserted through the inner collar 121. Bag frame 12 can have tabs 15 each of which with an aperture 16. The inner collar 121 can have protuberances 151 to insert through the corresponding apertures 16 of the bag frame 12.

Again, there can be various sizes and shapes of protuberances 151 to couple with their corresponding apertures 16 of corresponding sizes and shapes.

In the close-up view shown in FIG. 8, the tab 15 of the bag frame 12 can have a notch 17. When the waste bag 10 is to be removed from the waste pail 1, the user can wrap the tether/strap 18 around the neck of the waste bag 10 (whether the neck is twisted) and then loop the tether/strap 18 over some part (e.g., the middle part) of the folded bag frame 12 and secure the tether/strap 18 in the notch 17 before carrying the waste bag 10 to the dumpster. This can minimize the escape of odor from the waste bag 10 during transport.

Alternatively, this notch 17 can also function as a tie strap. For example, when the waste bag 10 is to be removed from the waste pail 1, the user can manually twist the neck of the waste bag and then fit the twisted neck into the notch 17 thereby keeping it twisted shut. The user may next carry the waste bag away without having to tie a knot.

In one embodiment, the inner collar 121 can use a set of protuberances 151 of different diameters, which are illustrated in FIG. 8. Here, the tabs 15 of the waste bag 10 also have corresponding different diameters of apertures 16.

Figure 9:
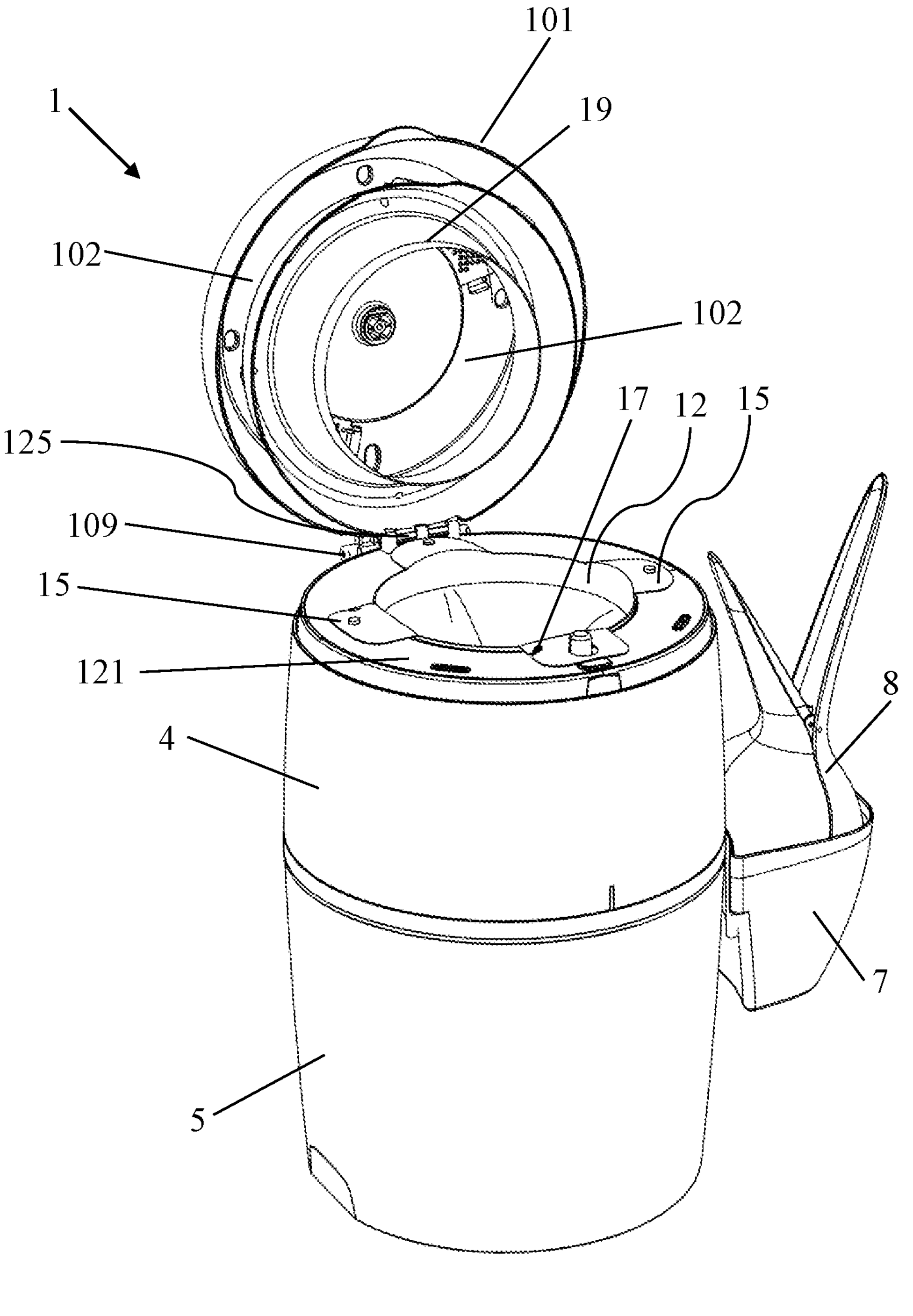
FIG. 9 is a perspective view of the contemplated waste pail of FIG. 7 with the lid insert fully pivoted open and a waste bag fully attached to the collar, according to an aspect of the embodiment.
Figure 10:
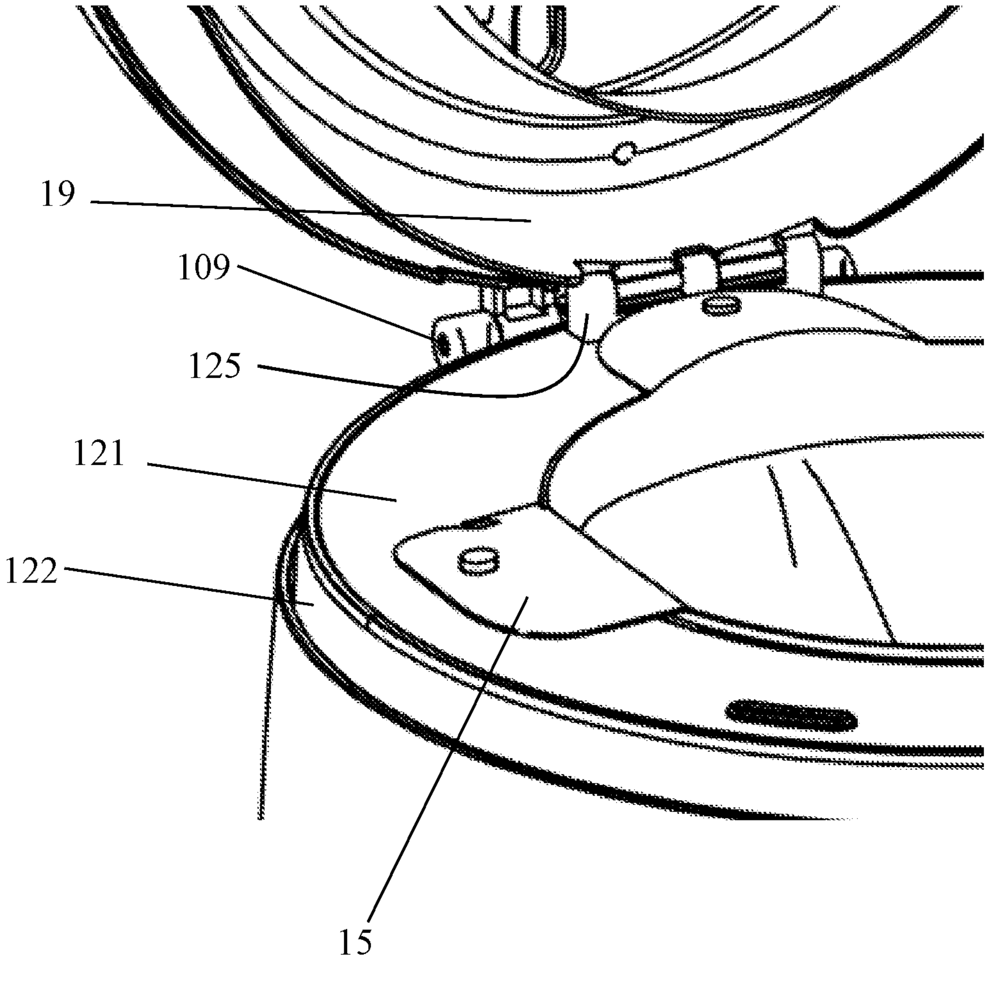
FIG. 10 is a close-up view of the bag frame of the waste bag as shown in FIG. 9, according to an aspect of the embodiment.

Referring now to FIG. 9, the tabs 15 of the waste bag 10 is now secured onto the inner collar 121. The user may next pivot the lid insert 19 downward onto the inner collar 121. FIG. 10 illustrates the embodiment where the lid insert 19 is pivotably coupled to the inner collar 121 via inner hinge 125.

In operation, the waste bag 10 should be "primed" by manually rotating the entire lid insert 19 and inner collar 121 combination in a preset direction and degree of angle. For example, a user can be asked to prime the waste bag clockwise 360 degrees. The direction of priming should be opposite to the driving direction of rotator 102 so that priming keeps the waste bag 10 twisted, while driving of the rotator untwists the waste bag 10. The relationship between the rotator 102 and the waste bag 10 will be further explained in association with FIGS. 13A through 19.

Figure 11:
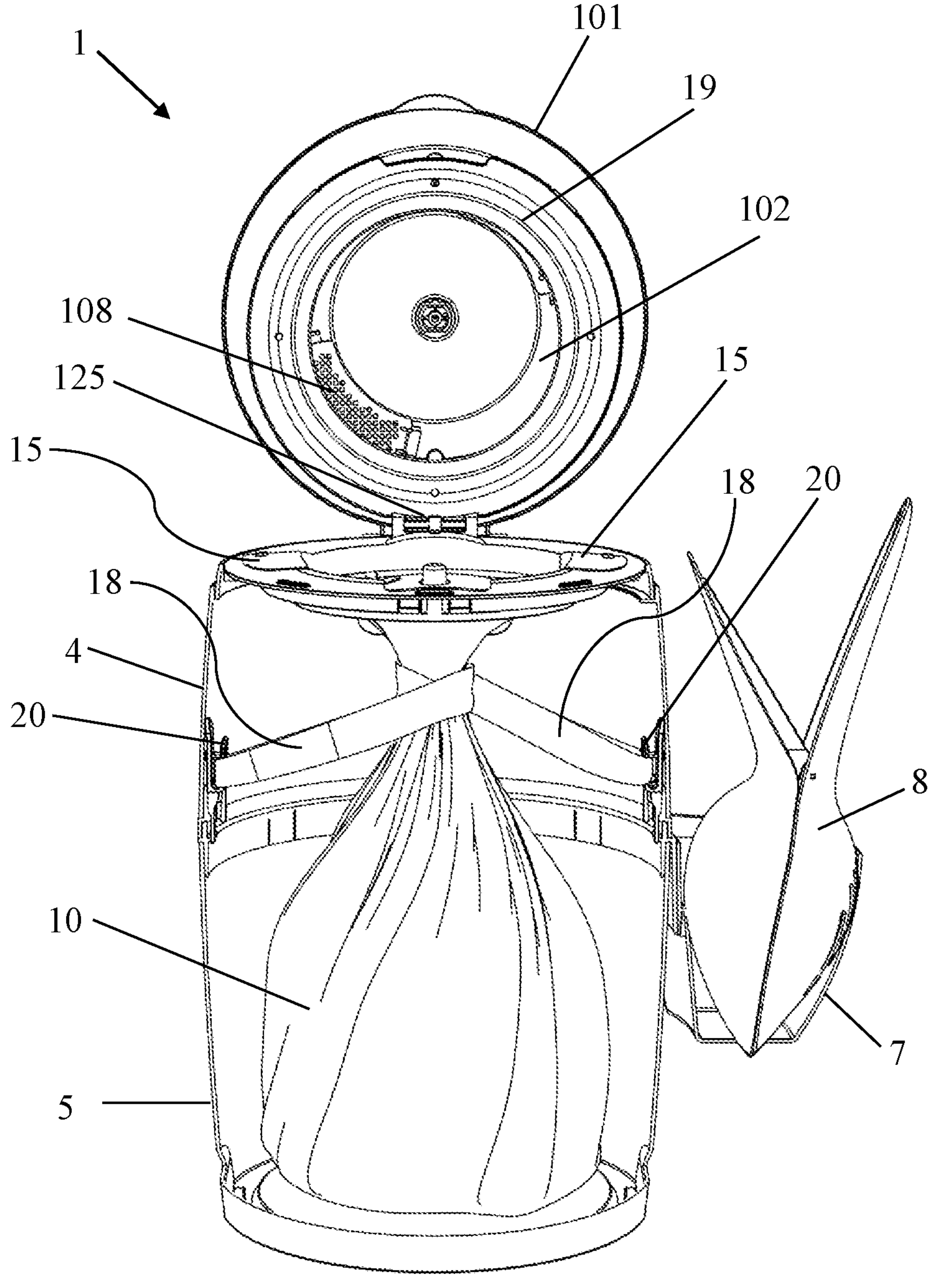
FIG. 11 is a cross-sectional view of the contemplated waste pail of FIG. 9, showing two tethers wrapped around the neck of the waste bag, according to an aspect of the embodiment.
Figure 12:
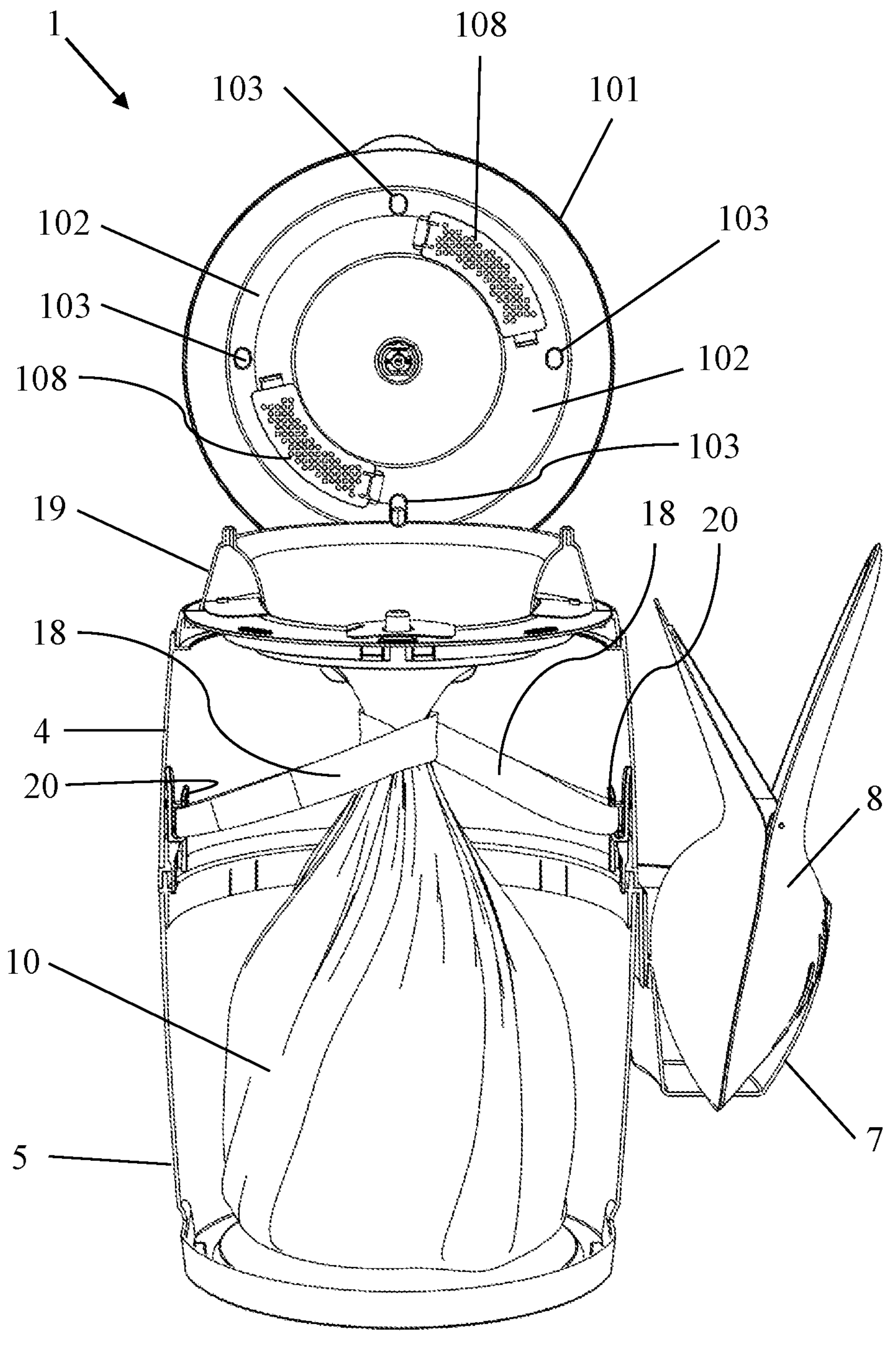
FIG. 12 is a cross-sectional view of the contemplated waste pail of FIG. 9 with the lid insert enclosing over the collar, according to an aspect of the embodiment.

Priming can be performed while the lid insert 19 is either in an up or down position. Preferably, it would be easier to rotate the inner collar 121 while the lid insert 19 is down and in a position directly over the inner collar 121. FIGS. 11 and 12 illustrate the twisted waste bag 10 after the waste bag 10 has been primed by the aforementioned method. Here, the priming direction is counter-clock wise from a top view of the waste pail 1.

In operation, the waste bag 10 would remain twisted at rest, until a user is ready to drop a waste article into the waste bag 10. The waste bag 10 can have tethers 18 already attached to a region near the neck, above the neck, or below the neck of the waste bag 10. In other words, these are specialty waste bags 10 made at the manufacturer with tethers 18 attached. During installation of the waste bag 10 into the bottom drum 3, a user can attach the free end of each tether 18 to its corresponding attachment point 20 to ensure proper closure by twisting of the tethers 18. These attachment points 20 can be located on the inside wall of the bottom drum 3. The attachment points 20 can be of different mechanical structures. For example, it can be a clip, a notch, a hook, etc.

For a user to reach the attachment point 20 by hand, the user may simply reach through the circular opening of the inner collar 121. Alternatively, the user may pivot open the lid insert 19/inner collar 121/outer collar 122 assembly from the top rim 6 of the bottom drum 3 for better access.

During priming, the free ends of each tether 18 remain secured to the attachment points 20 while the opposite ends of the tether 18 moves in a circular fashion along with the bag frame 12. This motion can cause the two tethers 18 to crisscross each other thereby sealing off the waste bag 10 by wrapping around the neck of it. In one embodiment, the neck region is also twisted shut, or partially twisted.

FIG. 12 illustrates a primed waste bag 10 where the lid insert 19 is in a down position over the inner collar 121. Here, the neck of the waste bag 10 is closed off or sealed off. In one embodiment, this provides a complete closure of the waste bag 10. In another embodiment, this provides a near-complete closure of the waste bag 10. The body portion or the bottom portion of the waste bag 10 may or may not have any secure attachment to the bottom drum 3. In other words, the body, or the bottom portion of the waste bag 10 may simply remain in place without being secured to the bottom drum in any other way. This is notable because in some embodiments, the body of the bag does not need to be secured in place to twist the neck of the waste bag 10. In the embodiment shown, the neck or the body portion of the waste bag 10 itself is not heavily twisted. The tethers 18 are twisted to create a crisscrossing closure even when the waste bag 10 itself remain untwisted or only partially twisted.

Lid Casing/Manual Actuator

As mentioned above, a primed waste bag 10 remains closed until a user is ready to drop a waste article down into it. This can be accomplished by using certain mechanisms within the lid casing 101 as will be described below in association with FIGS. 13A through 19.

When a user needs to dispose of a waste article, the user would manually lift the lid casing 101 open as illustrated in FIG. 3. The user would next drop the waste article into the funnel shape provided by the lid insert 19. At this point the waste bag 10 is still in a primed position, with its neck twisted closed by the tethers 18. The user would next close the lid casing 101 with the waste article still visibly held in or below the funnel of the lid insert 19. Referring now back to FIG. 3, once the lid casing 101 closes onto the lid insert 19, catchers 103 of the rotator 102 then matingly couple to their corresponding protuberances 151. In the particular embodiment shown in FIG. 3, there are four protuberances 151 coupled to four catchers 103. When the lid casing 101 is closed, the user may manually operate an actuator such as a turn knob 105 (FIGS. 1, 2, 13A, 13C) or a push button 4105 (FIGS. 16, 17A, 18A) to cause the rotator 102 to rotate in a driving direction opposite to the priming direction. When the rotator 102 rotates in a driving direction, the lid insert 19, the inner collar 121, and the bag frame 12 all move in the same driving direction, thereby causing the tethers 18 to untwist. When the tethers 18 and/or the neck of the bag is not twisted, the waste bag 10 opens which allows the waste article to drop into the waste bag, while the lid casing 101 remains closed. This can be important because in a typical trash can, the odor from within the waste bag would undesirably waft towards the user when the user disposes of a waste article into the waste bag. Here, the waste bag 10 remains closed when a user disposes of a waste article. This would keep odor sealed in during the disposal process.

There can be various types of mechanism to operate the rotator 102. Referring now to the embodiment of FIGS. 13A-13G. Here, there can be a turn knob 105 disposed on top of the lid casing 101. The turn knob 105 can rotate relative to the lid casing 101. Turn knob 105 is coupled to a bottom plate 116 to form an enclosure within which a flat torsion spring 115 can be housed.

The flat torsion spring 115 has a spiral configuration. Its peripheral free end can be attached to a stationary side post 138 (see FIG. 13D) which extends through the arcuate opening 136 of the bottom plate 116. The center free end of the flat torsion spring 115, on the other hand, can be exposed through a center opening 137 (see FIG. 13B) of the bottom plate 116 so that the center free end of the flat torsion spring 115 can be securely attached to a slit on a center post 140. The center post 140 is an integral part of secondary gear 111 so it can rotate along with the secondary gear 111. Note that the center post 140 does not necessarily have to be in absolute rotational center of the turn knob 105 or secondary gear 111. The rotational axis 152 of the secondary gear 111 is shown in FIG. 13F. Being secured to the rotatable center post 140 at one end and secured to the stationary side post 138 at the other end, the flat torsion spring 115 biases the secondary gear in a particular direction.

Figure 13A:
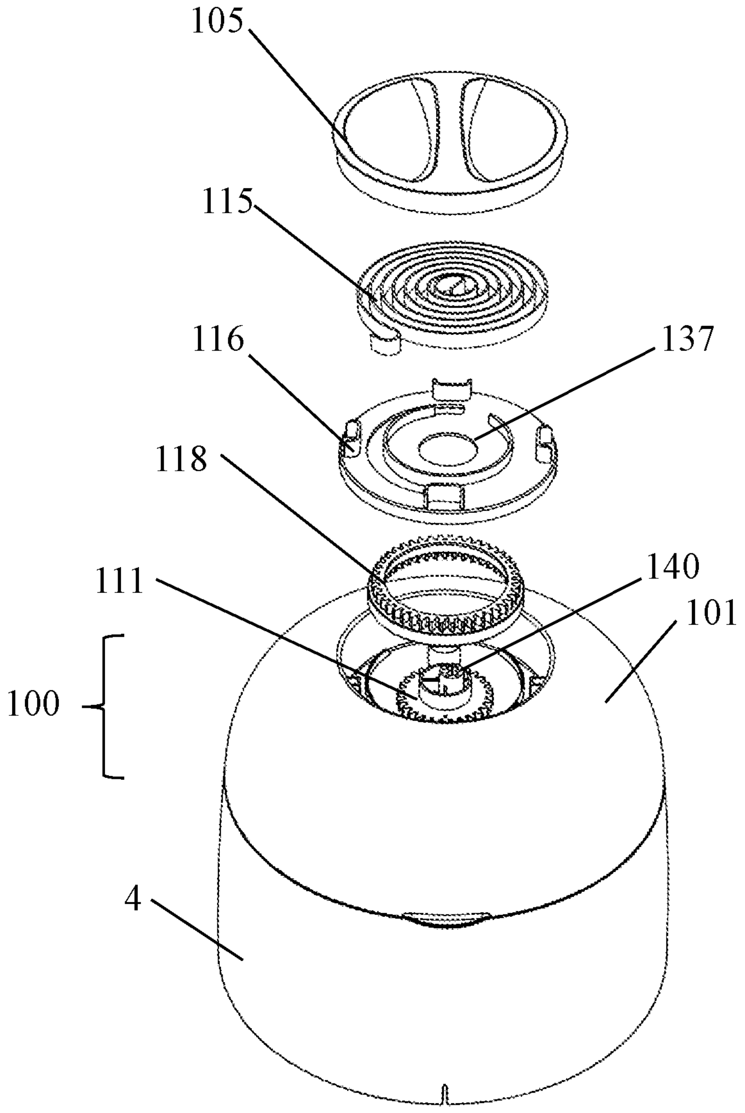
FIG. 13A is an exploded view of the contemplated components inside of a lid casing having a turn dial/turn knob as the manual actuator, according to an aspect of the embodiment.
Figure 13B:
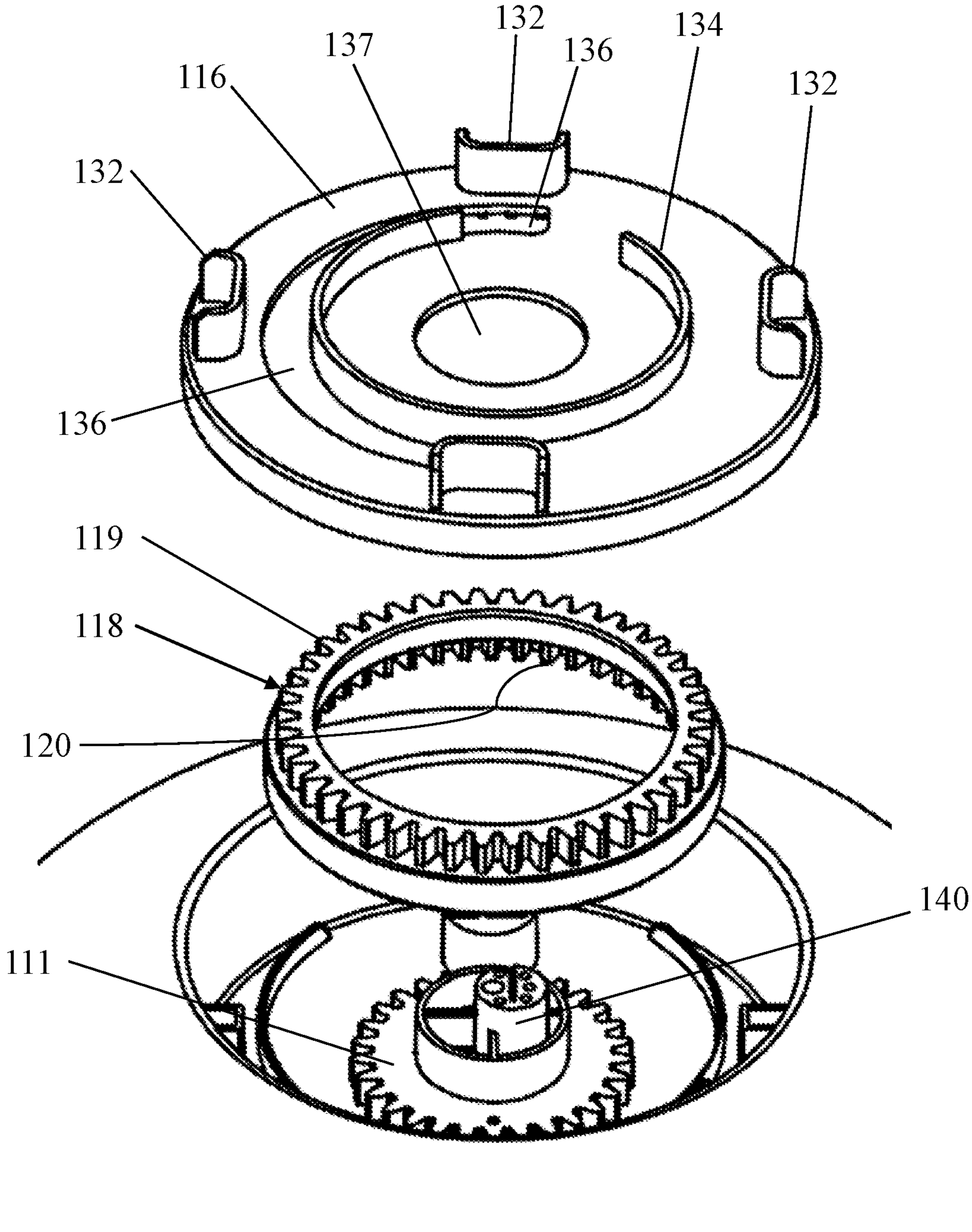
FIG. 13B is close-up view of FIG. 13A showing the bottom plate of the turn knob, an intermediate gear, and a secondary gear, according to an aspect of the embodiment.
Figure 13C:
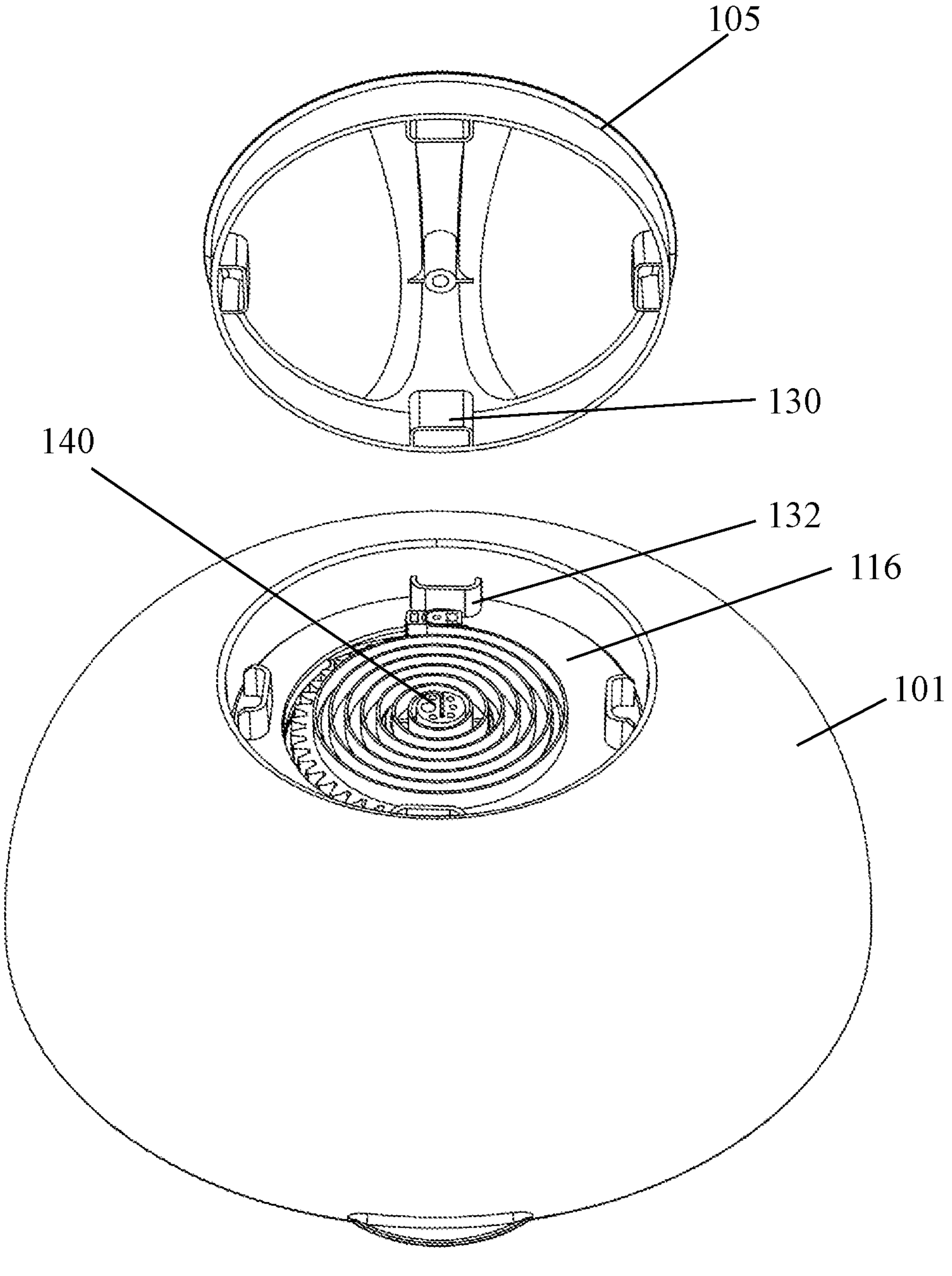
FIG. 13C is a perspective view of the lid casing of FIG. 13A with the turn knob removed, according to an aspect of the embodiment.
Figure 13D:
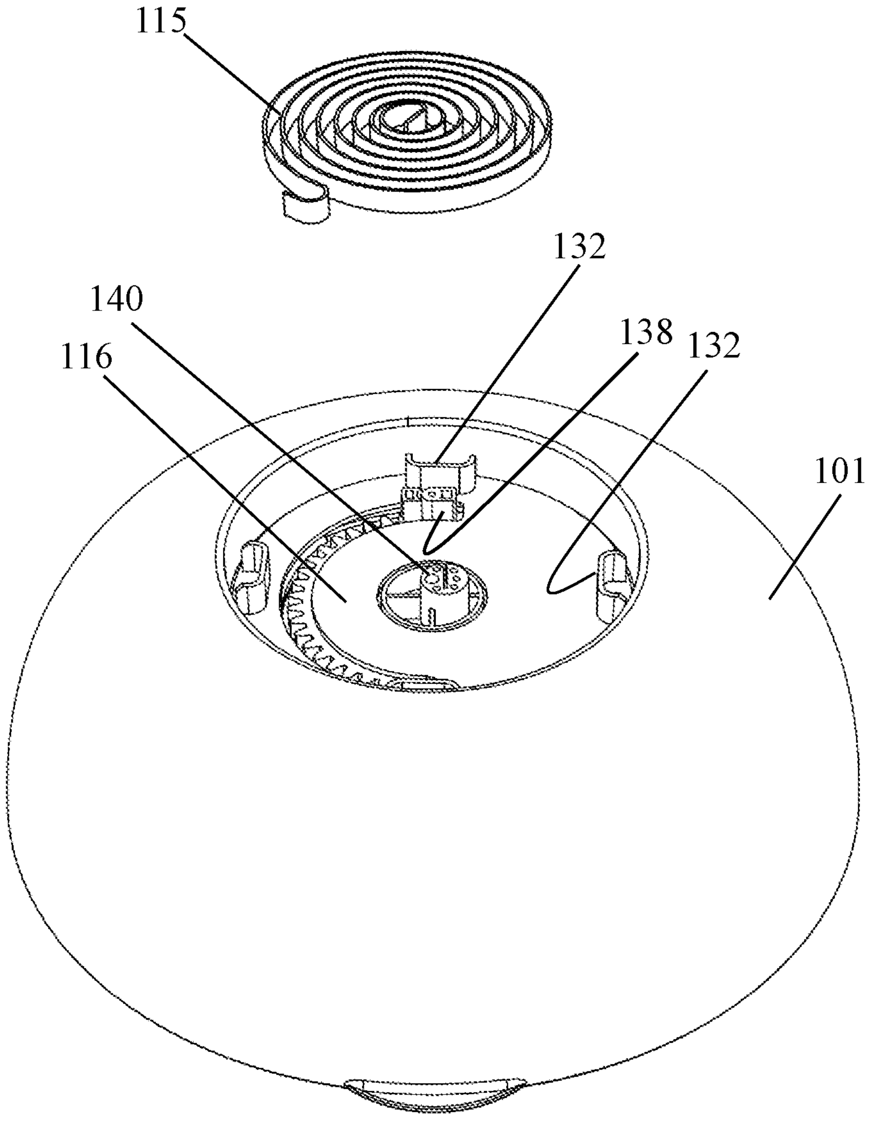
FIG. 13D is a perspective view of the lid casing of FIG. 13A with the turn knob and the flat spiral spring removed, according to an aspect of the embodiment.

Referring now to FIG. 13B, the bottom plate 116 of the turn knob 105 can have four raised columns 132 to be received into four corresponding receiving slots 130 (see FIG. 13C) on the underside of the turn knob 105. Besides the four raised columns 132, the arcuate opening 136 can provide a passage for the stationary side post 138 (see FIG. 13D) when the bottom plate 116 rotates relative to the stationary side post 138.

A retaining wall 134 can be provided on the surface of the bottom plate 116 to guide the flat torsion spring 115.

Under the bottom plate 116 of the turn knob 105 is an intermediate gear 118 having outward-facing teeth 119 and inward-facing teeth 120. The intermediate gear 118 can have a ring shape which can have a diameter large enough to fit the secondary gear 111. The intermediate gear 118 can have a diameter smaller than the driving gear 110 (see FIG. 13E).

In this particular embodiment, the driving gear 110 is part of the bottom plate 116 of the turn knob 105. Here, the underside of the bottom plate has inward-facing teeth 117 to matingly engage with the outward-facing teeth 119 of the intermediate gear 118. The intermediate gear 118 and the driving gear 110 are not co-axial.

A top view shown in FIG. 13F can better illustrate the spatial relationship between the gears. In FIG. 13F, although the turn knob 105 and the bottom plate 116 of the turn knob has been removed, the large top circular opening of the lid casing 101 can represent the approximate location and diameter of the driving gear 110. In this particular embodiment, the driving gear 110 is co-axial with the secondary gear 111. In other words, the rotational axis 156 of the driving gear 110 is the same as the rotational axis 152 of the secondary gear 111. The inward-facing teeth of the driving gear 110 and the entire driving gear 110 is kept in a centering position by the retaining wall 144. The retaining wall 144 is a structure similar to the retaining wall 134 of FIG. 13B. Here in FIG. 13F, the retaining wall can be an integral part of the floor 175 which remains stationary.

The inward-facing teeth of the driving gear 110 make mating engagement with the outward-facing teeth of the intermediate gear 118. Again, the intermediate gear 118 is offset from the driving gear 110, which is not co-axial with the intermediate gear 118. The intermediate gear 118 is held in position by a retaining wall 145 which is shown in FIG. 13G. In FIG. 13G, the intermediate gear 118 has been removed to reveal the secondary gear 111 and the retaining wall 145. The retaining wall 145 can be an integral part of the floor 175. The floor 175 remains stationary along with the retaining wall 145 and the side post 138.

Figure 13E:
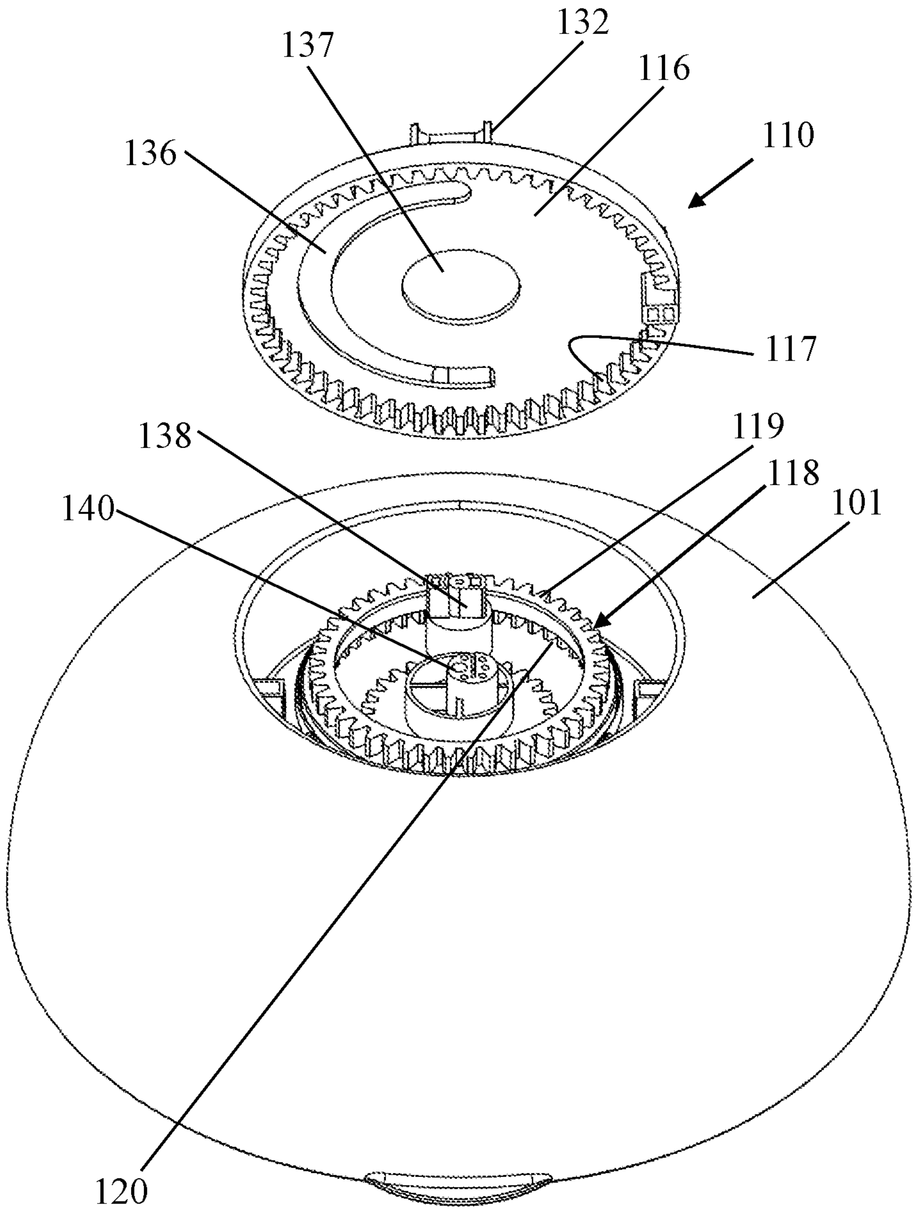
FIG. 13E is a perspective view of the lid casing of FIG. 13A with the turn knob, the flat spiral spring, and the bottom plate of the turn knob removed, according to an aspect of the embodiment.
Figure 13F:
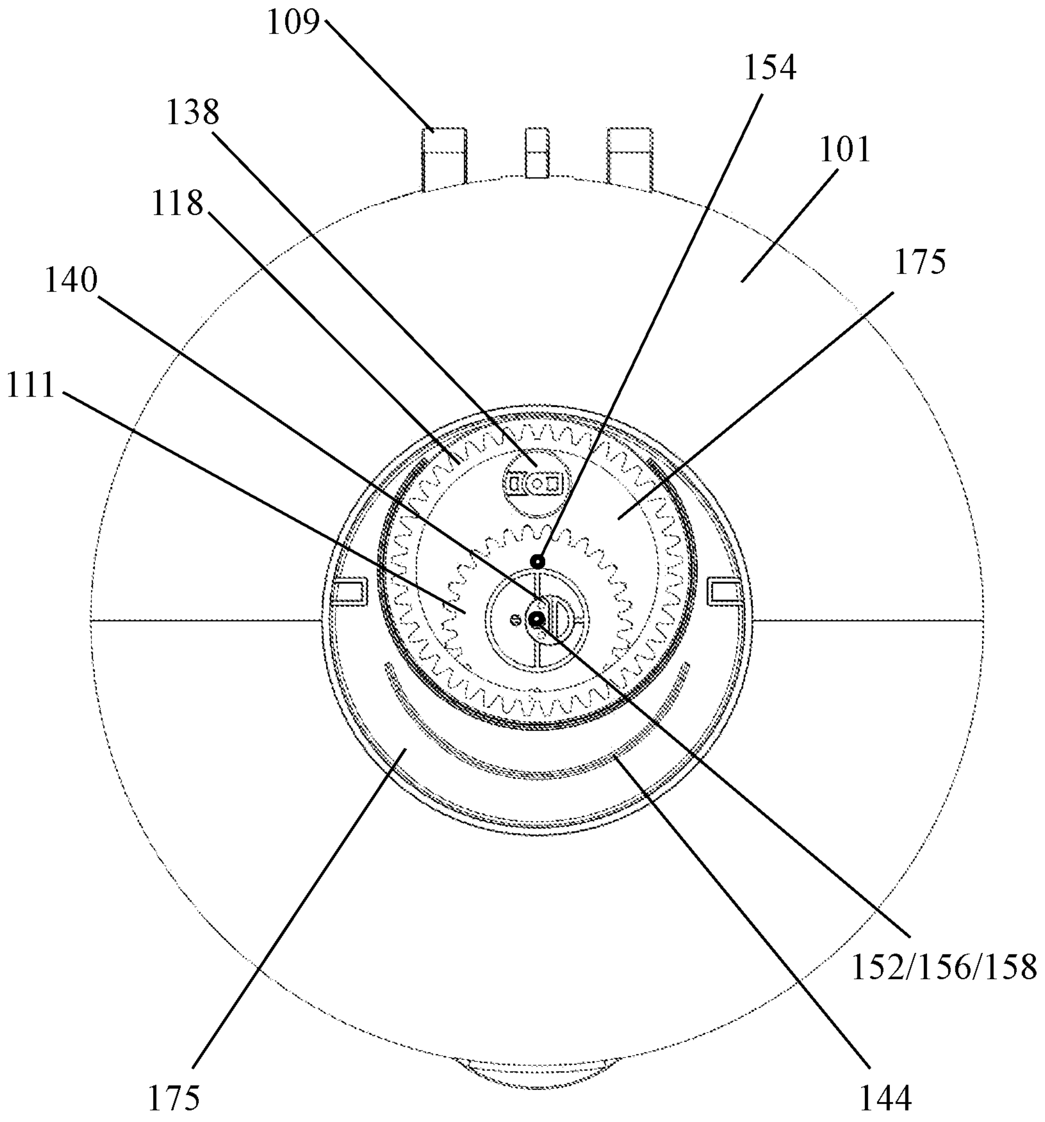
FIG. 13F is a top view of the lid casing of FIG. 13E with the turn knob, the flat spiral spring, the bottom plate of the turn knob removed, showing the intermediate gear and the secondary gear matingly engaged together in a non-coaxial placement, according to an aspect of the embodiment.
Figure 13G:
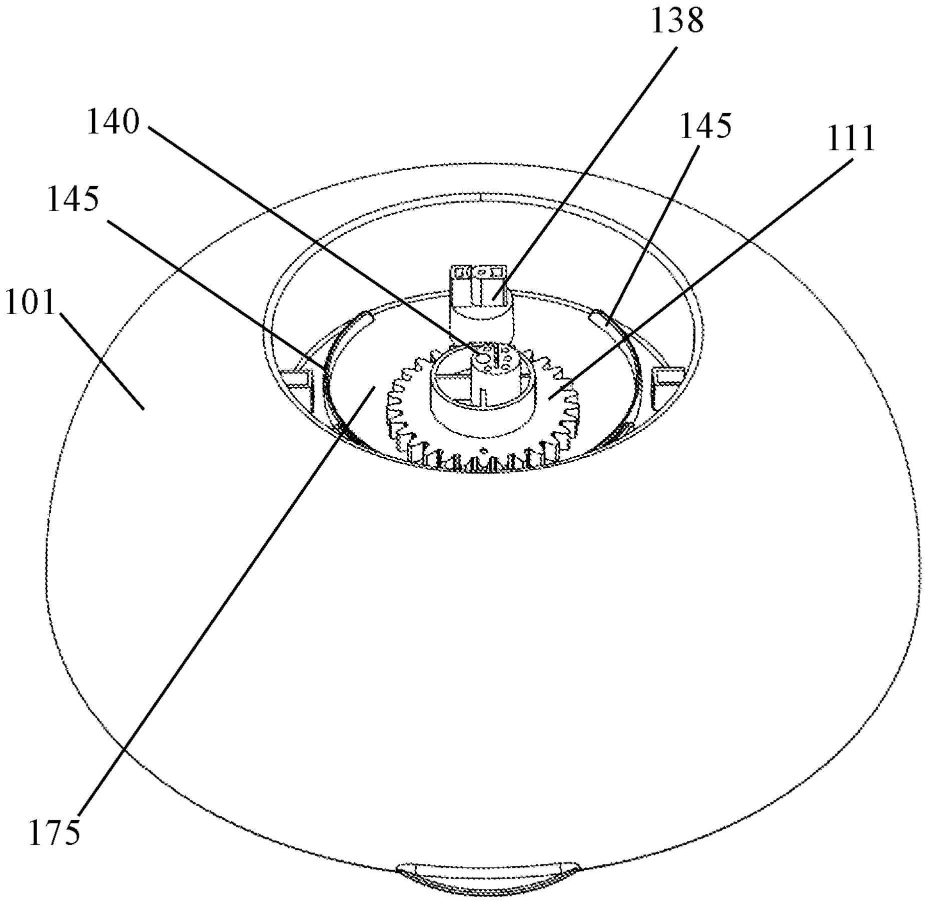
FIG. 13G is a perspective view of the lid casing of FIG. 13A with the turn knob, the flat spiral spring, the bottom plate of the turn knob, and the intermediate gear removed, according to an aspect of the embodiment.

Regarding the intermediate gear 118 of FIG. 13E, it can have inward-facing teeth 120 to make mating engagement with the outward-facing teeth of the secondary gear 111. The secondary gear 111 is not an integral part of the floor 175, therefore, it can rotate relative to the floor 175. Now referring back to FIG. 13G, when the spring-biased secondary gear 111 is driven to rotate, it co-axially rotates the rotator 102 (see FIGS. 3-7) which is disposed under the floor 175 and separably movable relative to the floor 175. In one embodiment, the secondary gear 111 is coupled to the rotator 102 via an axle (not shown).

The spring-biased secondary gear 111 transfers the biasing force to the turn knob 105 such that at rest, the turn knob 105 is at a position to keep the waste bag 10 in a primed position. When a user manually turns the turn knob 105 against the biasing force, the rotator 102 turns in a direction to untwist the waste bag 10. As soon as the user releases his or her hand from the turn knob 105, the biasing force can return the waste bag 10 into a twisted configuration.

Figure 14A:
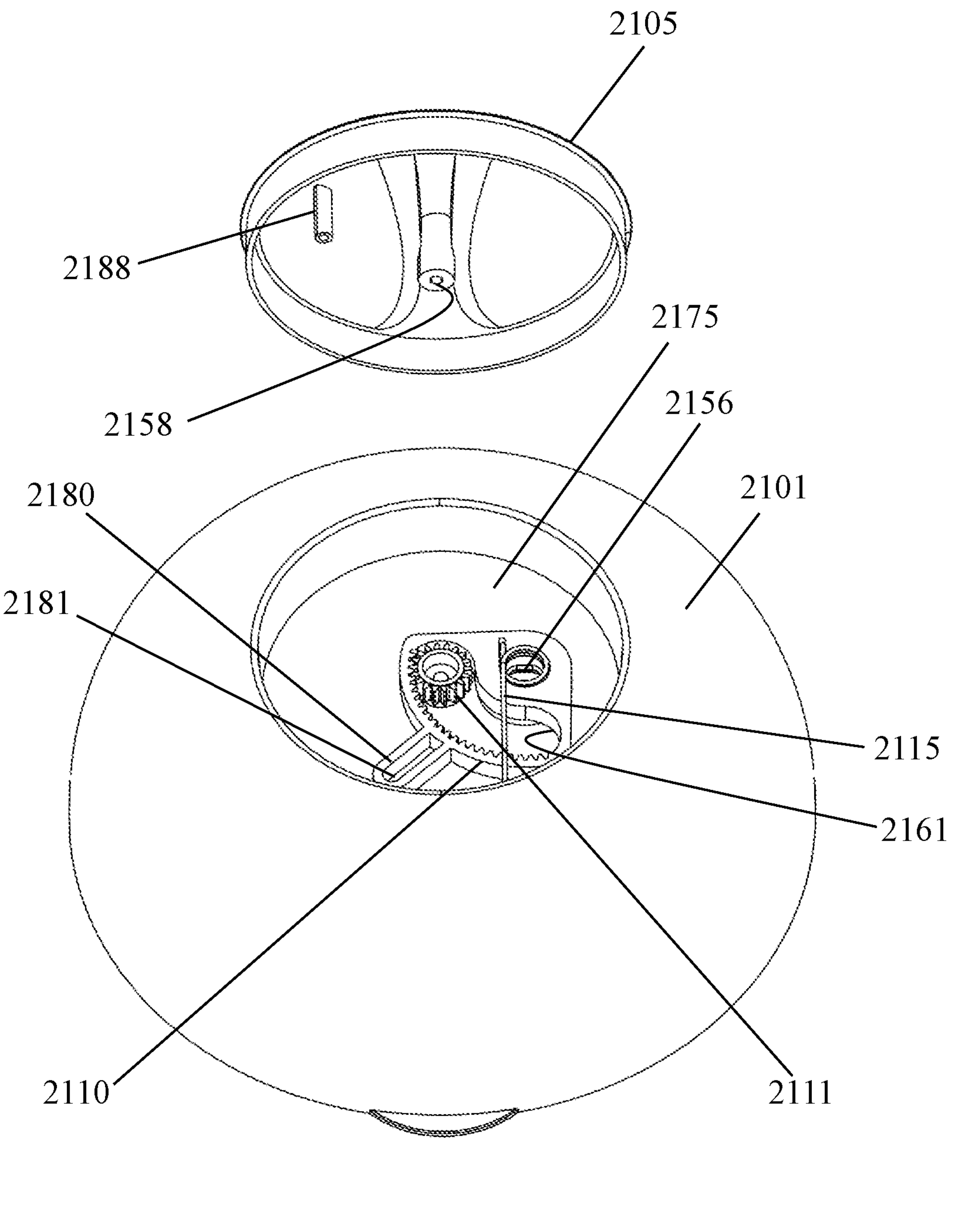
FIG. 14A is a perspective view of another contemplated lid casing having a turn knob shown here with the turn knob removed, according to an aspect of the embodiment.
Figure 14B:
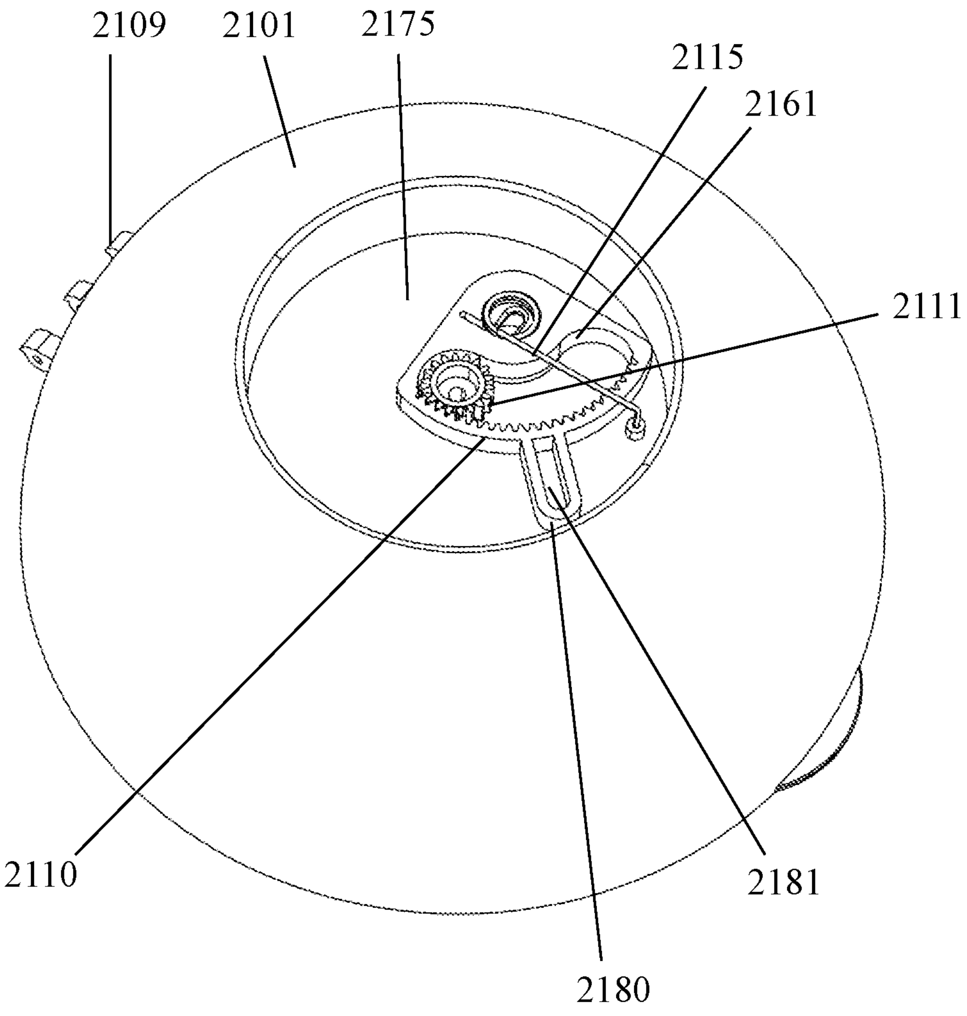
FIG. 14B is another view of the lid casing of FIG. 14A now showing the entirety of the driving gear in mating engagement with a secondary gear; the driving gear being biased by a spring, according to an aspect of the embodiment.

FIGS. 14A-14D illustrate yet another contemplated mechanism with the lid casing 2101, which can be pivotably coupled to the upper portion 4 of bottom drum 3 via an outer hinge 2109. Here, the turn knob 2105 has a vertical rod 2188 disposed on its underside. The underside of the turn knob 2105 also has a center post with a rotational axis 2158 that is co-axial with the rotational axis of the secondary gear 2111. The secondary gear 2111 can have a hollow center within which the center post of the turn knob 2105 can fit. Here, the vertical rod 2188 fits within a linear slot 2181 of a distal guide 2180. The distal guide 2180 is an integral part of the driving gear 2110. The driving gear 2111 in this embodiment is fan-shaped with an arcuate opening 2161 which has inward-facing teeth. The driving gear 2111 rotates about its rotational axis 2156 and is biased by a torsion spring 2115. FIG. 14B shows the torsion spring 2115 anchored into the floor 2175. The floor 2175 is stationary and does not rotate. When a user turns the turn knob 2105, the vertical rod 2188 moves the distal guide 2180 thereby swings the fan-shaped driving gear 2110 in one direction. When the driving gear 2110 swings in one direction relative to the stationary floor 2175, it causes the secondary gear 2111 to rotate relative to the stationary floor 2175. The secondary gear 2111 is co-axial with and coupled to the rotator 102 (FIGS. 1-6) such that when the secondary gear 2111 rotates, the rotator 102 also rotates.

Figure 14C:
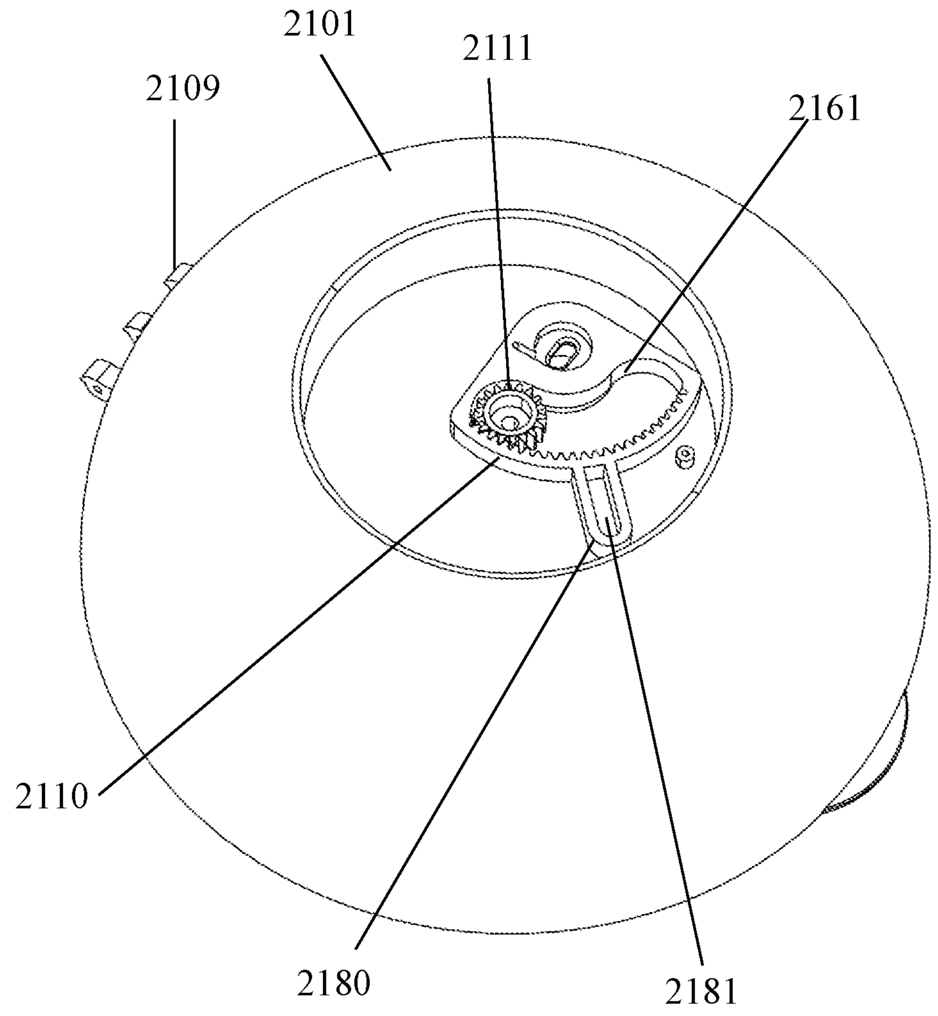
FIG. 14C is a perspective view of the lid casing of FIG. 14B with the spring removed, according to an aspect of the embodiment.
Figure 14D:
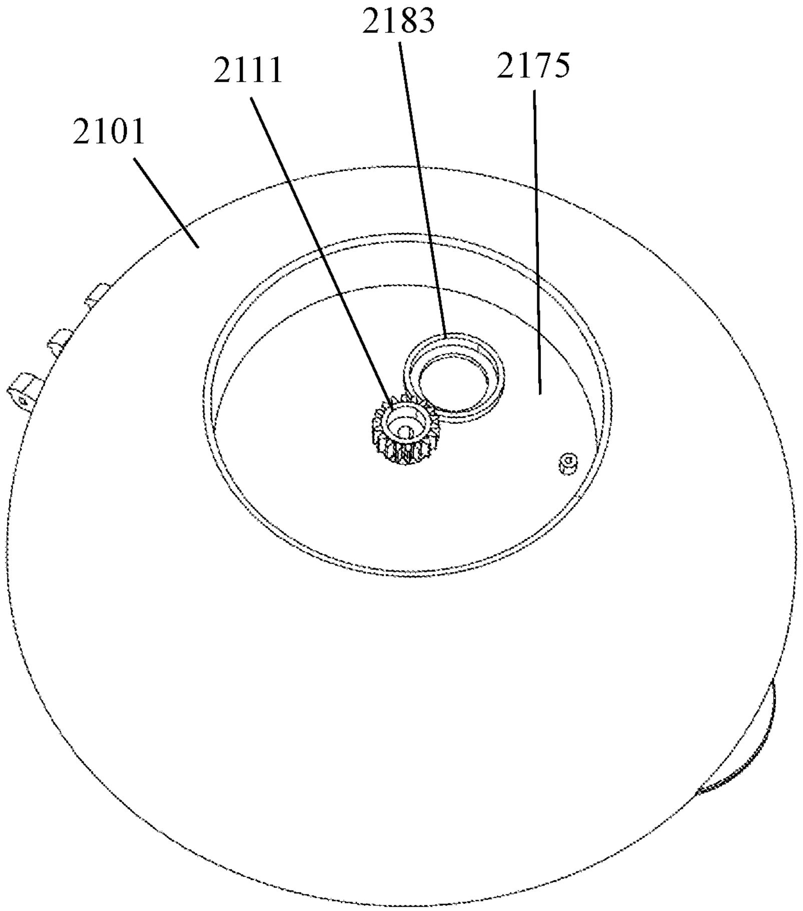
FIG. 14D is a perspective view of the lid casing of FIG. 14C with the driving gear removed, exposing the secondary gear and a circular wall, according to an aspect of the embodiment.

FIG. 14C illustrates the fan-shaped driving gear 2110 with the torsion spring 2115 removed. In FIG. 14D, the driving gear 2110 is removed to reveal a circular wall 2183. The circular wall 2183 is an integral part of the floor 2175 which remains stationary. The circular wall 2183 functions to keep the fan-shaped driving gear 2110 in a rotational position to rotate along an axis that is co-axial with the circular wall 2183.

Figure 15A:
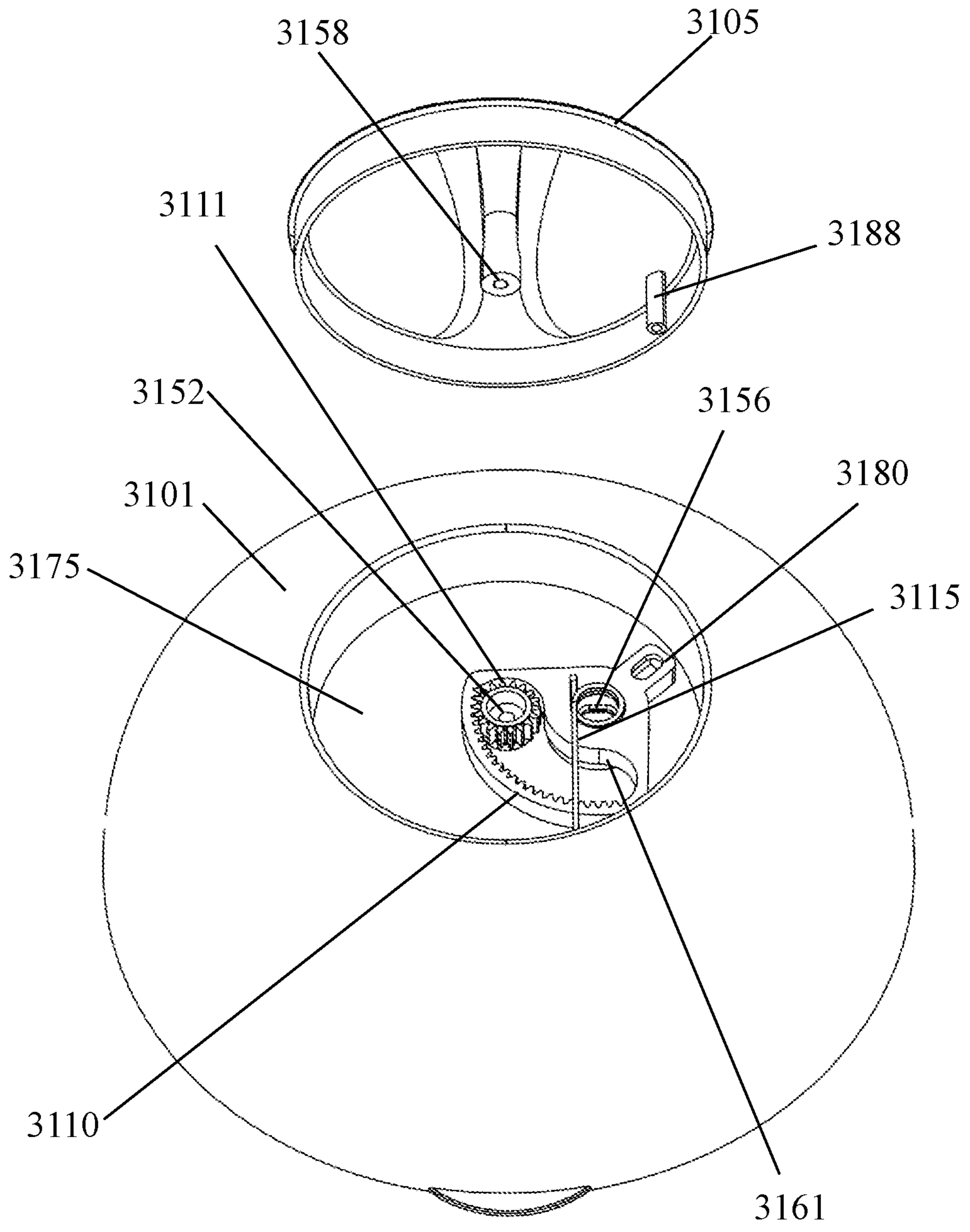
FIG. 15A is a perspective view of yet another contemplated lid casing having a turn knob shown with the turn knob removed, exposing a spring-biased driving gear in mating engagement with a secondary gear, according to an aspect of the embodiment.
Figure 15B:
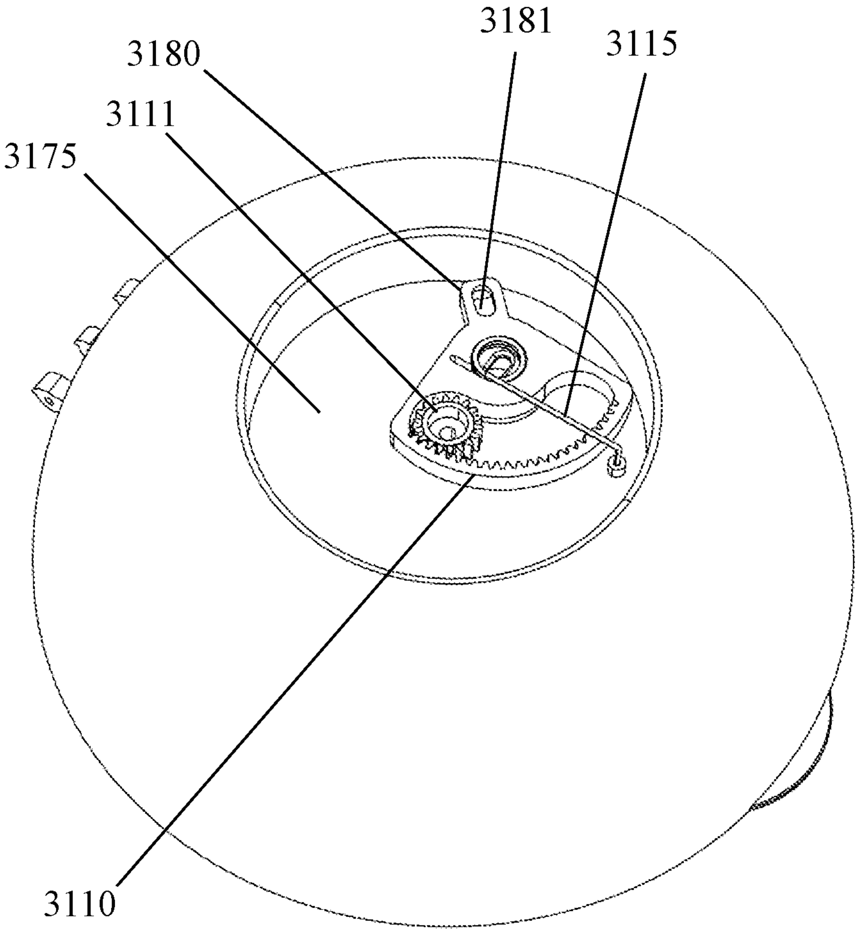
FIG. 15B is a perspective view of the contemplated lid casing of FIG. 15A from a different angle to show the driving gear in its entirety, according to an aspect of the embodiment.
Figure 15C:
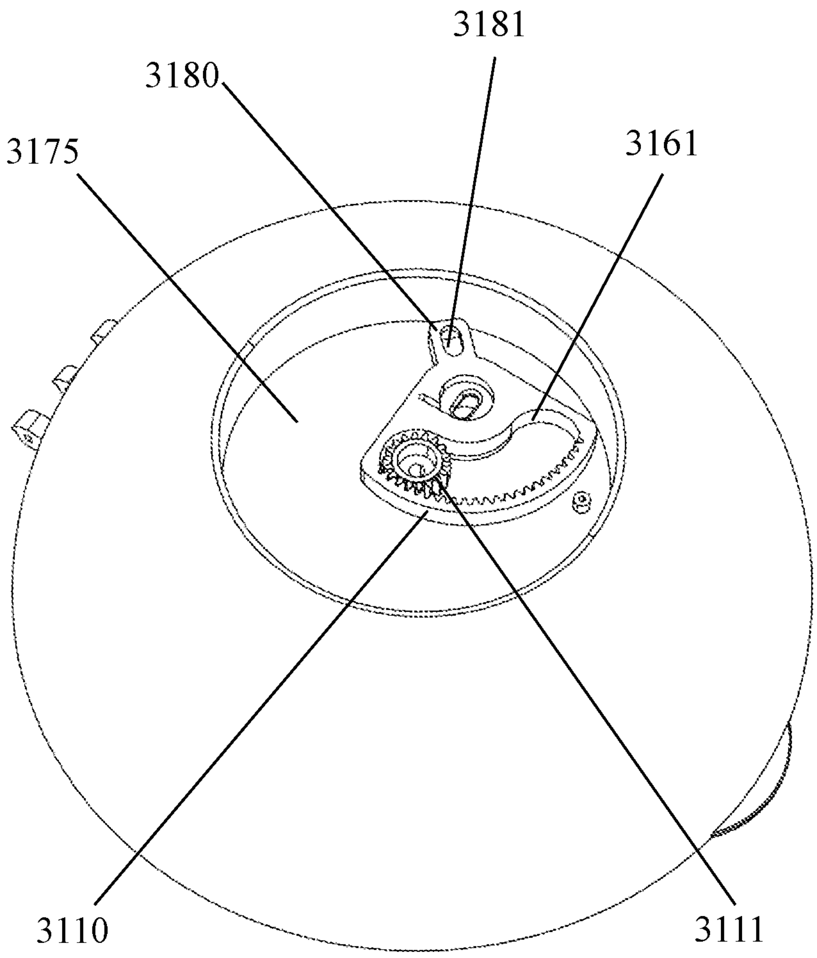
FIG. 15C is a perspective view of the contemplated lid casing of FIG. 15B with the spring removed, according to an aspect of the embodiment.
Figure 15D:
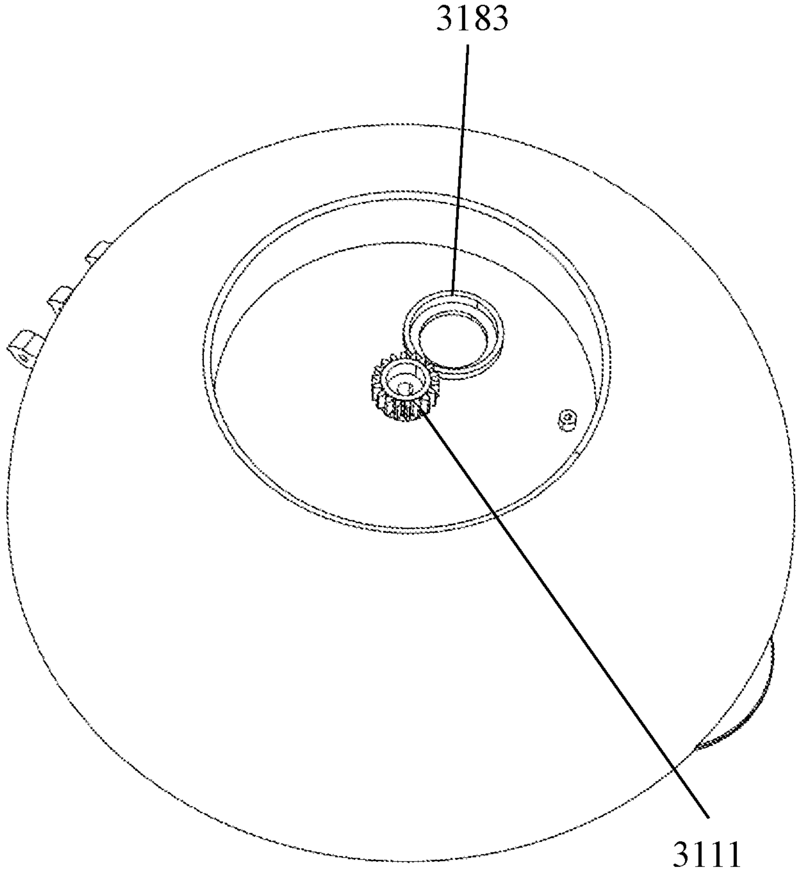
FIG. 15D is a perspective view of the contemplated lid casing of FIG. 15C with the driving gear removed, leaving behind a circular wall, according to an aspect of the embodiment.

FIGS. 15A-15D illustrate a design similar the design in FIGS. 14A-14D. The major difference between the two designs is the location of the distal guide 2180. In FIG. 15A, the distal guide 3180 is located on the opposite end of the fan-shaped driving gear 3110. Here, disposed on the lid casing 3101 is a turn knob 3105 with a vertical rod 3188 disposed on its underside. The underside of the turn knob 3105 also has a center post having a rotational axis 3158 that is co-axial with the rotational axis of the secondary gear 3111. The secondary gear 3111 can have a hollow center within which the center post of the turn knob 3105 can fit. Here, the vertical rod 3188 fits within a short linear slot 3181 of the distal guide 3180. The distal guide 3180 can be an integral part of the driving gear 3110. The driving gear 3111 in this embodiment is fan-shaped with an arcuate opening 3161 having inward-facing teeth. Being biased by a torsion spring 3115, the driving gear 3111 can rotate about its rotational axis 3156. FIG. 15B shows the torsion spring 3115 anchored into the floor 3175. The floor 3175 is stationary and does not rotate. When a user turns the turn knob 3105, the vertical rod 3188 moves the distal guide 3180 thereby swings the fan-shaped driving gear 3110 in one direction. When the driving gear 3110 swings in one direction relative to the stationary floor 3175, it causes the secondary gear 3111 to rotate relative to the stationary floor 3175. The secondary gear 3111 is co-axial with and coupled to the rotator 102 (FIGS. 1-6) such that when the secondary gear 3111 rotates, the rotator 102 also rotates.

Figure 16:
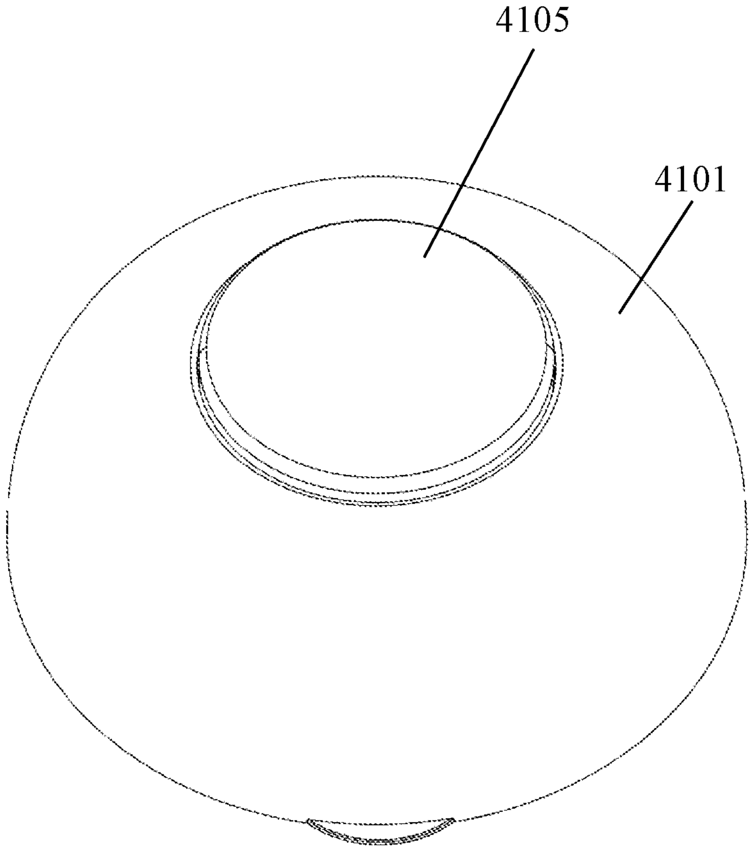
FIG. 16 is a perspective view of yet another contemplated lid casing having a button as the manual actuator, according to an aspect of the embodiment.

FIG. 16 illustrates an embodiment where the manual actuator is a push button 4105 disposed on top of the lid casing 4101. FIG. 16 is in simplified view where the bottom drum 3 is not shown. One of ordinary skill would immediately recognize that this embodiment of manual actuator can have the same bottom drum 3, inner collar 121, outer collar 122, and waste bag 10.

Figure 17A:
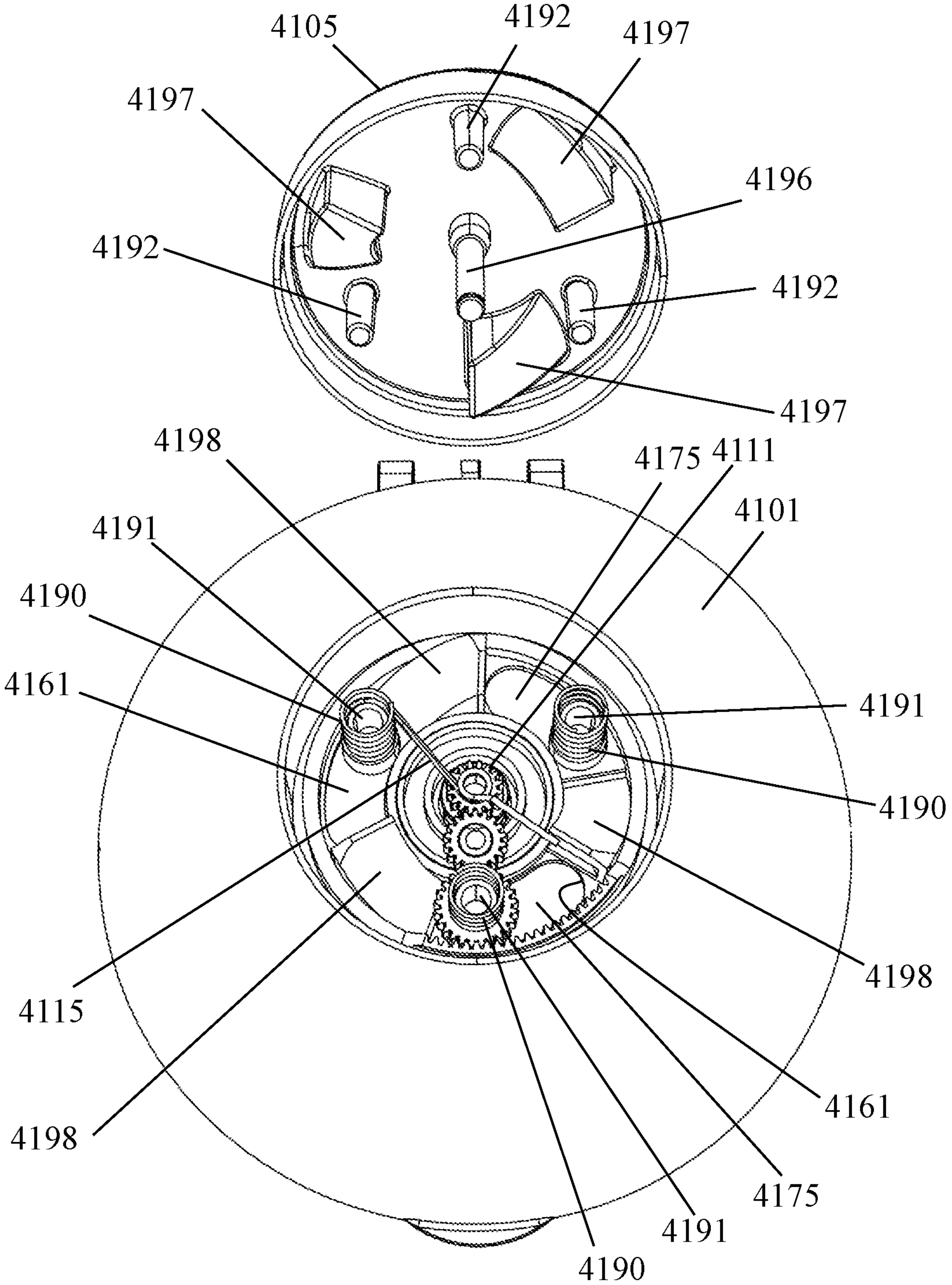
FIG. 17A is perspective view of still another contemplated lid casing where the button is removed, exposing the inner components within, according to an aspect of the embodiment.

Referring now to FIGS. 17A-17E regarding yet another embodiment of the push button mechanism enclosed within the lid casing 4101. In FIG. 17A, the manual actuator is a push button 4105 with its underside shown. The top side of this push button 4105 is shown in FIG. 16. Here in FIG. 17A, the underside of the push button 4105 can have a center rod 4196 disposed at the center. The center rod 4196 can be co-axial with the secondary gear 4111. The secondary gears 4111 can remain within the lid casing 4101 such that when the push button 4105 is installed onto the lid casing 4101, the center rod 4196 would be directly above the secondary gear 4111. At rest, there should be a sufficient clearance between the end tip of the center rod 4196 and the secondary gear 4111 so that when a user manually presses the push button 4105 downward, the clearance would allow the center rod 4196 to move downward. In some alternative embodiments, this center rod 4196 is not necessarily present. The center rod 4196 is non-movable relative to the push button 4105. The center rod 4196 can be an integral part of the push button 4105.

There can be three anchoring posts 4192 vertically extending from the bottom of the push button 4105. Each of the three anchoring posts 4192 is non-movable relative to the push button 4105. When the push button 4105 is installed onto the lid casing 4101, these three anchoring posts 4192 are received within three corresponding anchoring sleeves 4191. These anchoring sleeve 4191 are shown in FIG. 17A with a compression spring 4190 fitted over each. FIGS. 17B-17E provide a better view of the anchoring sleeve 4191 where the compression springs 4190 have been removed. These three compression springs 4190 can provide a biasing force against a downward movement of the push button 4105.

These anchoring sleeves 4191, being fixed onto the stationary floor 4175, do not rotate along with the secondary gear 4111. In FIG. 17A, the stationary floor 4175 is partially shown through the three arcuate openings 4161 of the driving gear 4110. FIG. 17E shows the stationary floor 4175 with the driving gear 4110 removed.

Returning now to FIG. 17A, the three anchoring posts 4192 can be received within the three corresponding anchoring sleeves 4191 all of which do not rotate. The push button 4105 also do not rotate during any steps of operating the push button 4105. Instead, the downward action of the push button 4105 causes the driving gear 4110 to rotate relative to the floor 4175 and the three anchoring sleeves 4191.

On the underside of the push button 4105 there can be three raised ramps each of which has a curved biasing surface 4197. These curved biasing surfaces 4197 abut against three corresponding curved receiving surfaces 4198 that are part of the driving gear 4110. These curved biasing surfaces 4197 and their corresponding curved receiving surfaces 4198 can have various angels and each of them can be a slanted surface instead of a curved surface. A better view of the driving gear 4110 is shown in FIG. 17E with the driving gear 4110 removed from the lid casing 4101. In FIG. 17E, the driving gear 4110 has a disc structure with three arcuate openings 4161. In between the arcuate openings 4161 there can be three curved receiving surfaces 4198. There is also a plurality of inward-facing gear teeth 4117 disposed along the rim of the driving gear 4110. In the center of the driving gear 4110 there can be a circular opening.

Under the driving gear 4110 there can be a stationary floor 4175 and three anchoring sleeves 4191 all of which are fixed to the stationary floor 4175. There can also be an intermediate post 4193 fixed to the stationary floor 4197. The purpose of the intermediate post 4193 will be described later.

In the middle of the floor 4175 there can be a circular opening that exposes the secondary gear 4111 which can be coupled to the rotator 102 (see FIGS. 1-4). The secondary gear can rotate together with the rotator 102 relative to the floor 4175 which remains stationary during the operation of the waste pail 1. There can be a torsion spring 4115 that has one end (upper left end in FIG. 17A) to bias against an anchoring sleeve 4191 and has another end (lower right end in FIG. 17A) to bias against a curved receiving surface 4198. In this way, the driving gear 4110 is biased in a counter-clockwise direction. When the curved biasing surfaces 4197 come down to abut against the curved receiving surfaces 4198, the angle of the curved receiving surfaces 4198 causes the driving gear 4110 to turn in a clockwise direction against the biasing force of the torsion spring 4115.

Figure 17B:
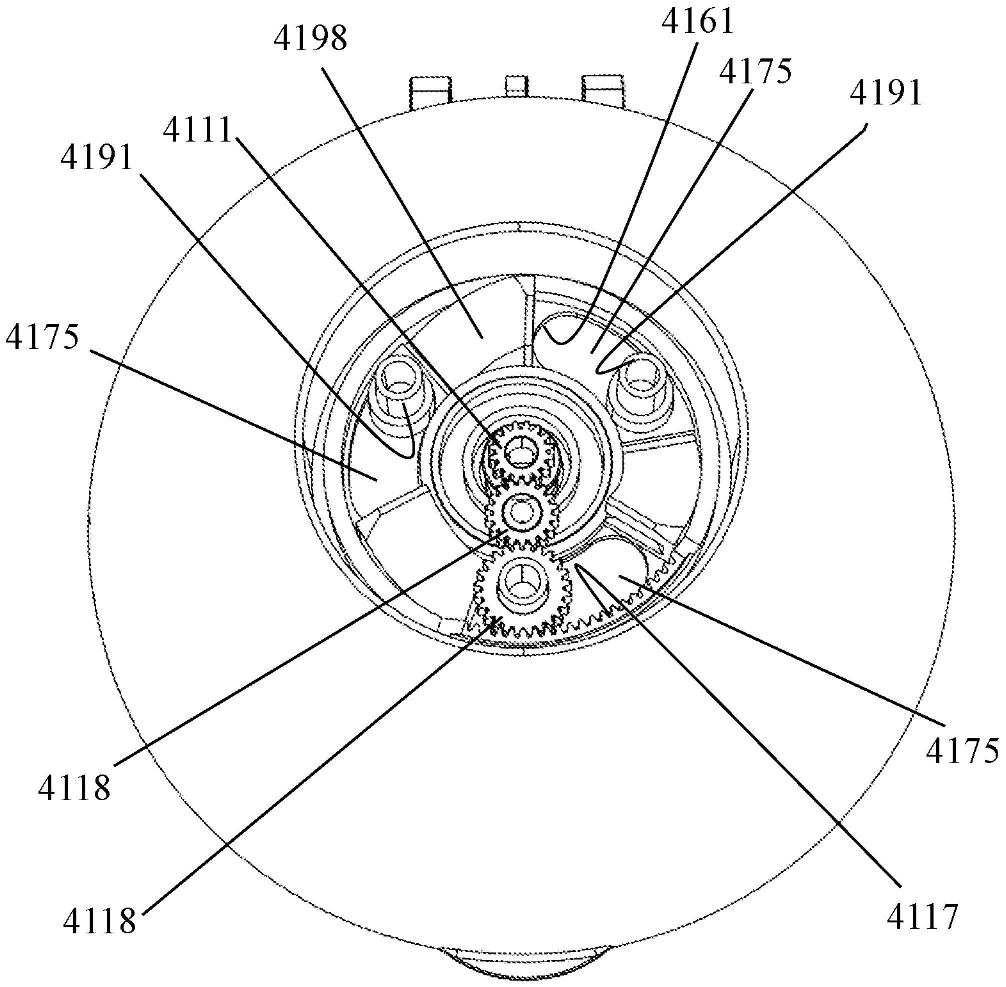
FIG. 17B is a perspective view of the contemplated lid casing of FIG. 17A with the compression springs and torsion spring removed, leaving behind a driving gear, two intermediate gears, a secondary gear, according to an aspect of the embodiment.

FIG. 17B illustrates the driving gear 4110 with the torsion spring 4115 and compression springs 4190 removed. Here, it can be clearly seen that the inward-facing teeth 4117 of the driving gear 4110 is in mating engagement with an intermediate gear 4118. This intermediate gear 4118 is rotatably fixed in place by one of the three anchoring sleeves 4191. This intermediate gear 4118 is in turn engaged with a smaller intermediate gear 4118 that is rotatably fixed in placed by the intermediate post 4193 (see FIGS. 17D, 17E) which was briefly discussed above. This smaller intermediate gear 4118 can then transfer motion and power to the secondary gear 4111. Secondary gear 4111 can be coupled to the rotator 102 (see FIGS. 1-4) via an axle/drive shaft with they share.

Figure 17C:
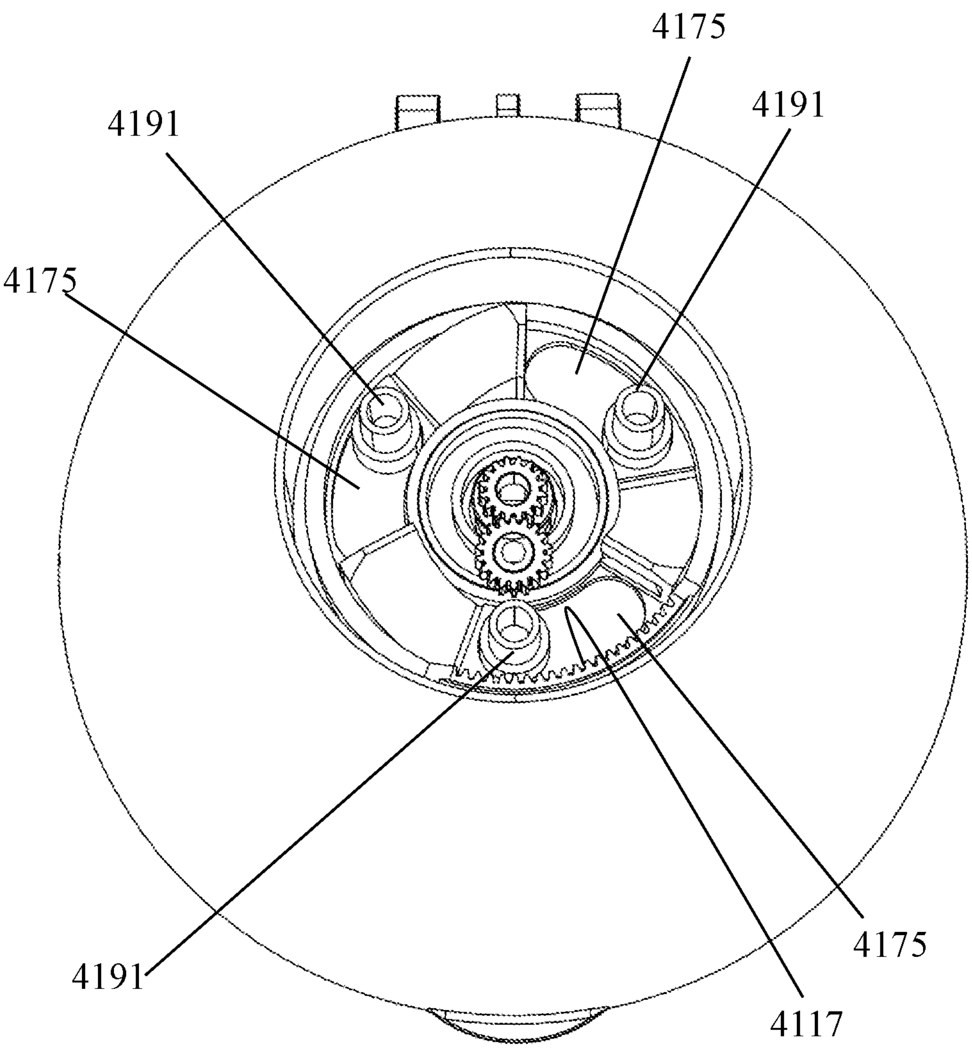
FIG. 17C is a perspective view of the contemplated lid casing of FIG. 17B with one of the two intermediate gears removed, according to an aspect of the embodiment.
Figure 17D:
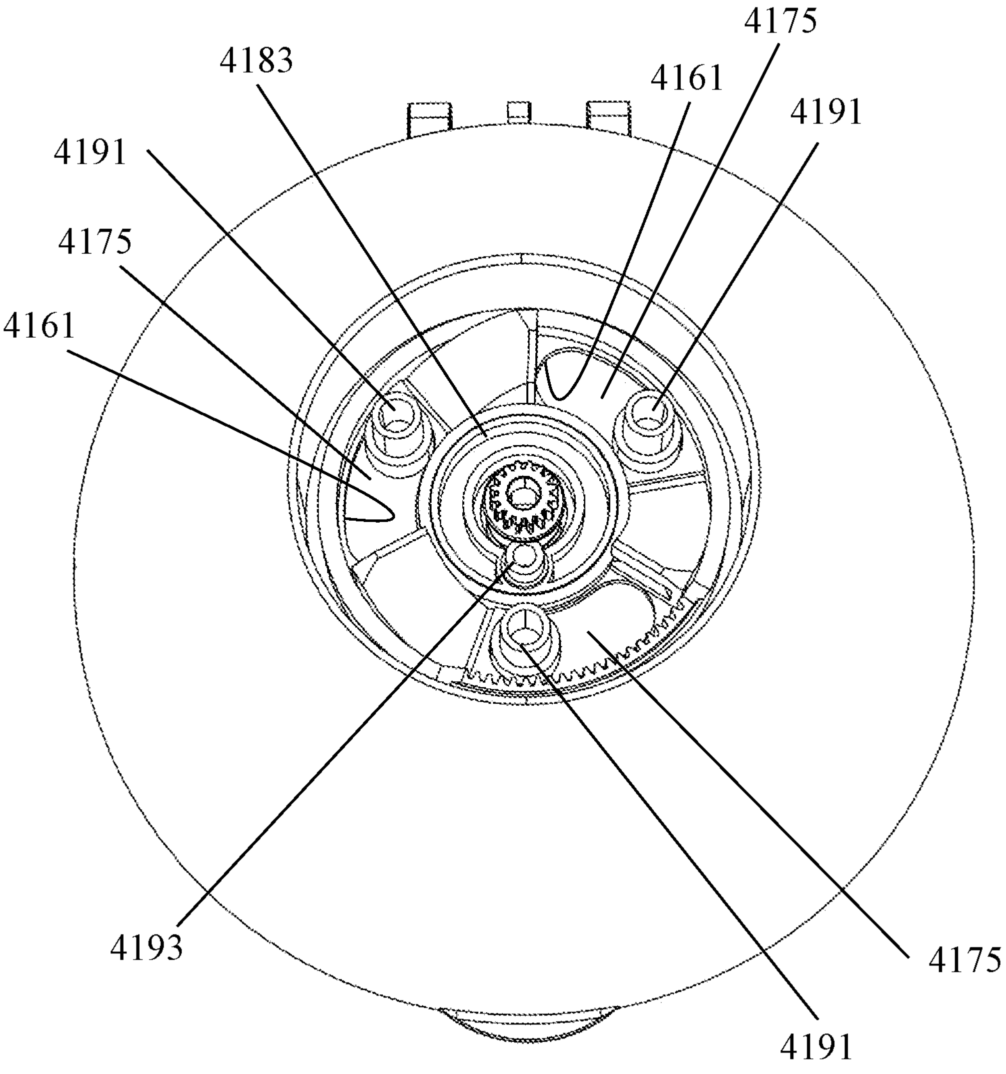
FIG. 17D is a perspective view of the contemplated lid casing of FIG. 17B with both intermediate gears removed, according to an aspect of the embodiment.
Figure 17E:
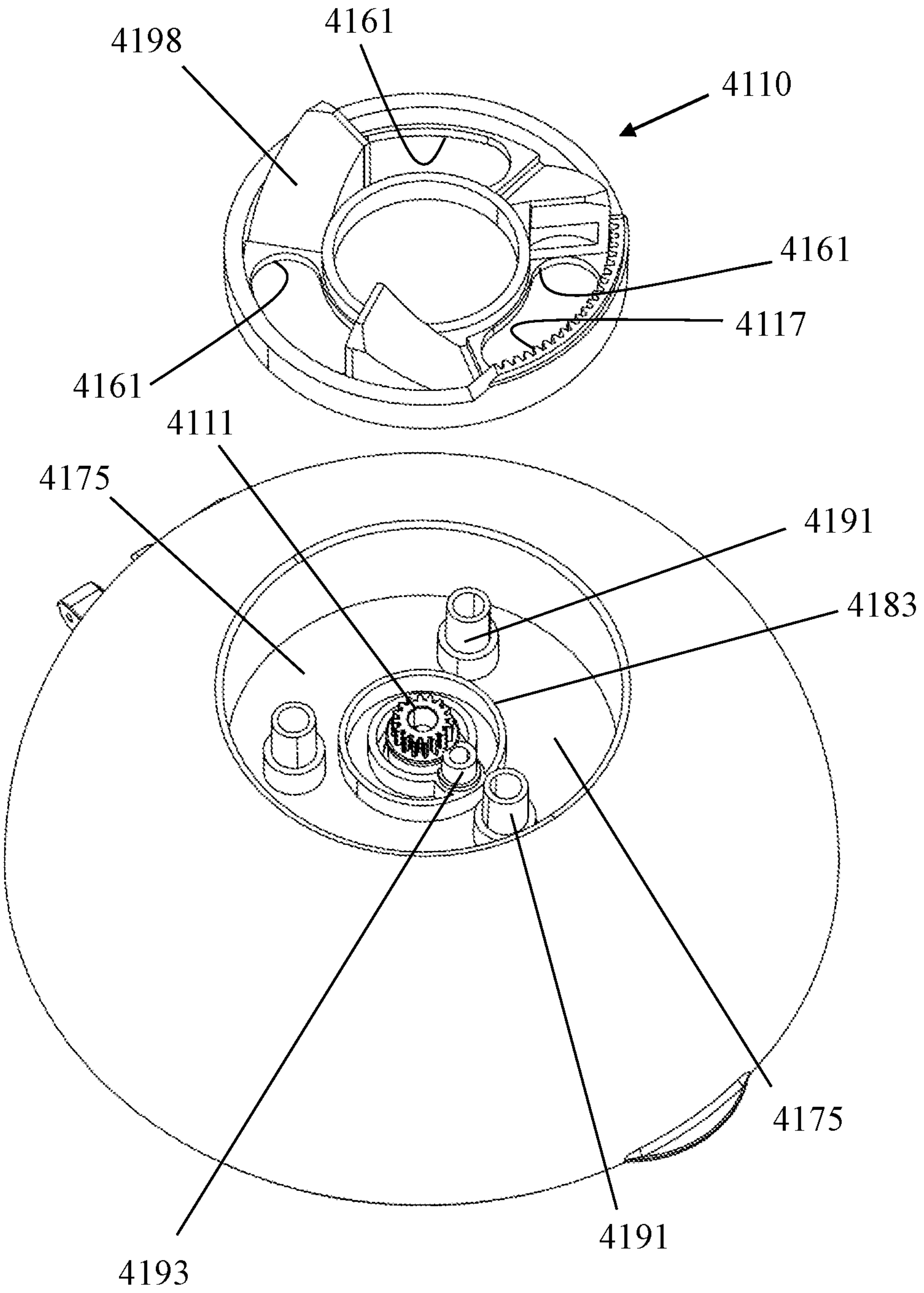
FIG. 17E is a perspective view of the contemplated lid casing of FIG. 17D with the driving gear removed, according to an aspect of the embodiment.

FIG. 17C shows where one of the two intermediate gears 4118 is removed. FIG. 17D illustrates the various parts with both intermediate gears 4118 removed.

Figure 18A:
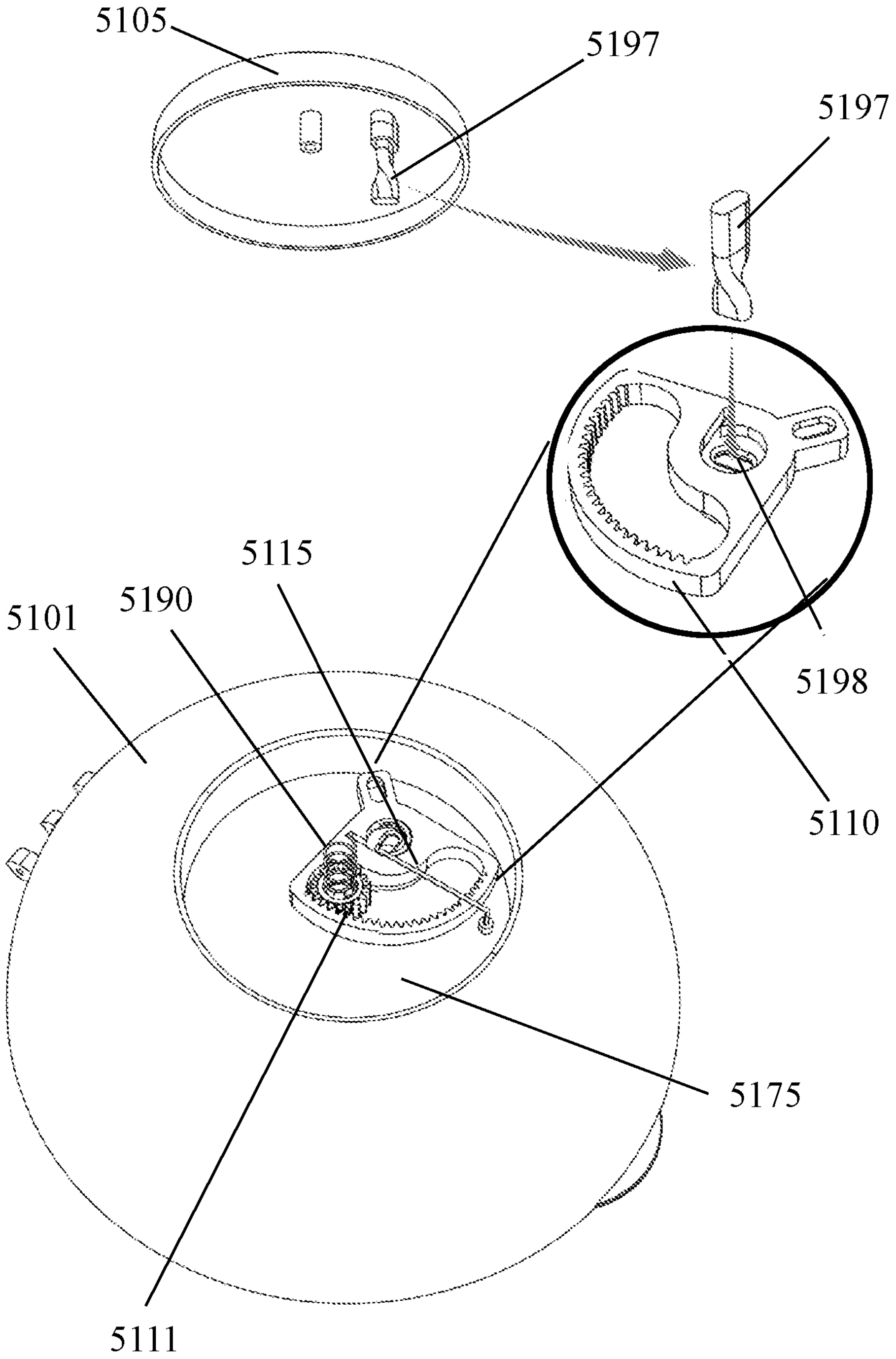
FIG. 18A is perspective view views of yet another contemplated lid casing along with two close-up views of the associated inner components. Here, the button is removed, exposing the inner components within, according to an aspect of the embodiment.
Figure 18B:
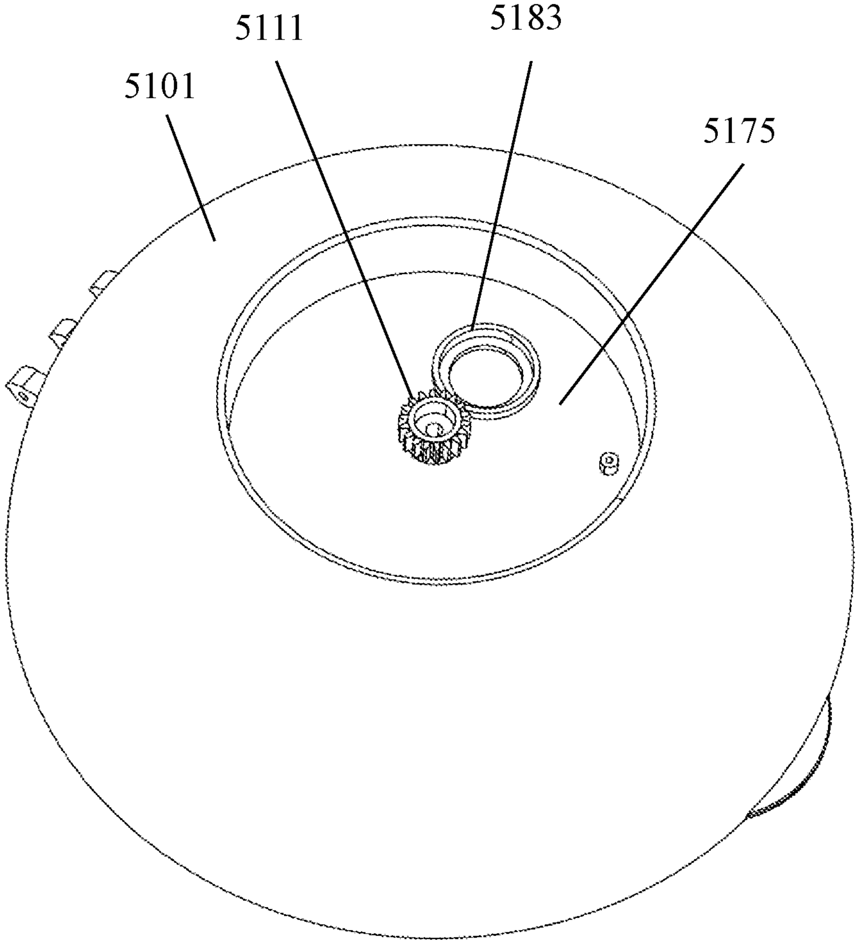
FIG. 18B is a perspective view of the contemplated lid casing of FIG. 18C with the driving gear, compression spring, and torsion spring removed, according to an aspect of the embodiment.

Referring now to FIGS. 18A-18B where still another embodiment of gear mechanism is contemplated. Here, the manual actuator is a push button 5015 such as what is shown in FIG. 16. The underside of this push button 5015 can include a vertically disposed twisted plate 5197. Disposed under the push button 5015 is a fan-shaped driving gear 5110 having an arcuate opening with inward-facing gear teeth. At the rotational center of the driving gear 5110 there can be a slot 5198 through which the twisted plate 5197 can be positioned. The shape of the slot 5198 can be substantially similar to the cross-sectional shape of the twisted plate 5197.

FIG. 18A has the twisted plate 5197 and the driving gear 5110 in an expanded view. The twisted plate 5197 is fixed onto the push button 5015 which does not rotate. The twist plate 5197 also does not rotate or otherwise move independently of the push button 5015. When the push button 5015 is manually pressed downward against the biasing force of the compression spring 5190, the spiral configuration of the twisted plate 5197 causes the driving gear 5110 to rotate, thereby directly driving the secondary gear 5111.

In FIG. 18B, most of the components have been removed to show only a floor 5175 which has a circular wall 5183. The circular wall 5183 can be an integral part of the floor 5175 and can position the driving gear 5110 in place. The floor 5175 is contemplated to be stationary and not rotatable relative to the lid casing 5101. The secondary gear 5111, on the other hand, can rotate independently of the floor 5175. The secondary gear 5111 is coupled to the rotator 102 (see FIG. 1-4) via an axle they share such that when the secondary gear 5111 is driven to rotate, the rotator 102 also rotates in the same direction.

Figure 19:
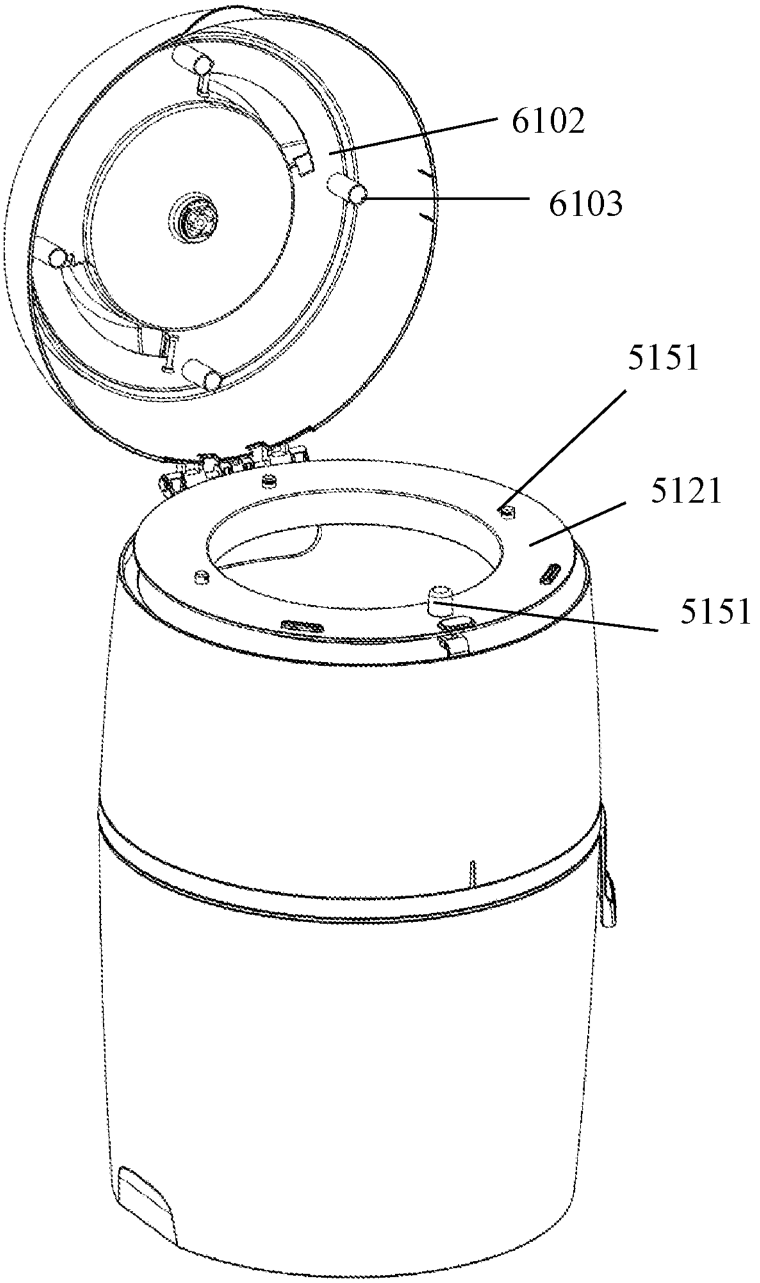
FIG. 19 illustrates another embodiment of the waste pail where the rotator directly connects to the inner collar without a lid insert, according to an aspect of the embodiment.

In FIG. 19, further contemplated is a design where the lid insert 19 of FIGS. 3-7, 9-12 is not present. All other components and functions can remain the same. This design may implement any of the above-mentioned gear mechanism types. It can also use the above-mentioned waste bag in the same fashion. Here, the rotator 6102 can have four catchers 6103 that are sufficiently long to directly couple to the protuberances 5151 on the inner collar 5121.

One of the protuberances 5151 can have a distinctive shape or size so that the rotator 6102 can close down on the inner collar 5121 only if the inner collar is at a particular position, e.g., only when the user has primed the waste bag by manually rotate the inner collar 5121.

FIGS. 20-23 illustrate yet another embodiment of waste pail 1 using a turn knob 7105 to actuate a rotator 7102 disposed on the underside of the lid casing 7101. Here, no gears are necessarily present. In FIGS. 20-23, only the top drum 2 and its inner components are illustrated. When fully assembled, this embodiment could have an exterior appearance such as that shown in FIGS. 1 and 2. When the top lid 7101 is pivoted open, it could have the appearance as that shown in FIGS. 3-12. One of ordinary skill in the art would immediately recognize that the top drum 2 of FIGS. 20-23 as well as its inner components can interchange with any of the other components disclosed elsewhere in this application relative to top drum 2.

Figure 20:
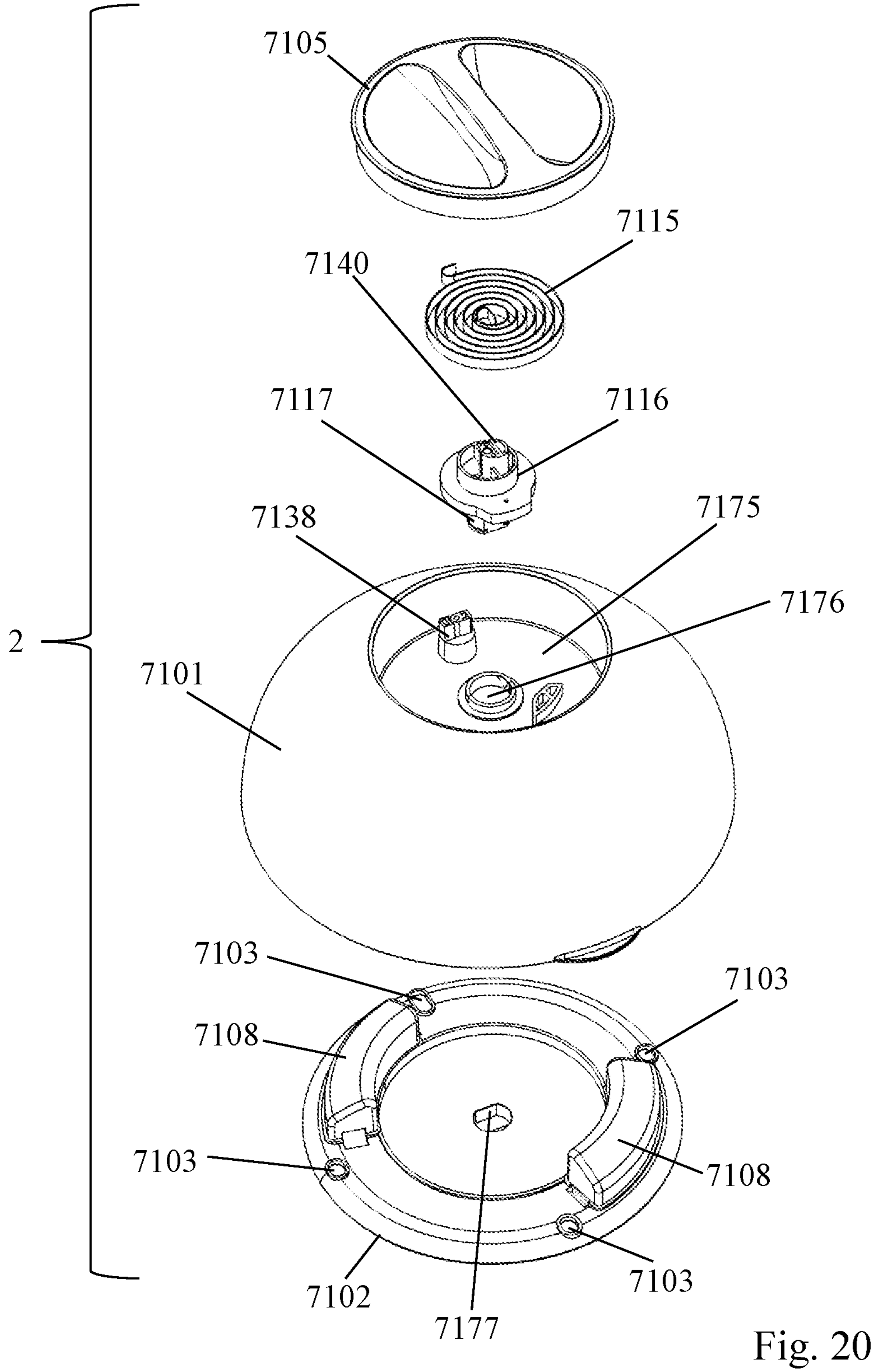
FIG. 20 is an exploded view of yet another embodiment of a top drum where no gears are used, according to an aspect of the embodiment.

Referring now to FIG. 20, this embodiment of the top drum 2 can include a lid casing 7101 having a generally dome shape. On top of the lid casing 7101 there can be chamber having a floor 7175. This floor 7175 can be integral with the lid casing 7101 and cannot move relative to the lid casing 7101. There can be a center hole 7176 through which a bottom end 7117 of an axle 7116 can be inserted through. As will be described in more details later, the axle 7116 couples the turn knob 7105 to the rotator 7102 such that when a user manually turns the turn knob 7105, the rotator 7102 also turns.

There can be a torsion spring 7115 disposed on the floor 7175 of the chamber. As will be described in more details later, this torsion spring 7115 biases the axle 7116 which in turn forces the rotator 7102 in a primed position during rest.

Figure 21:
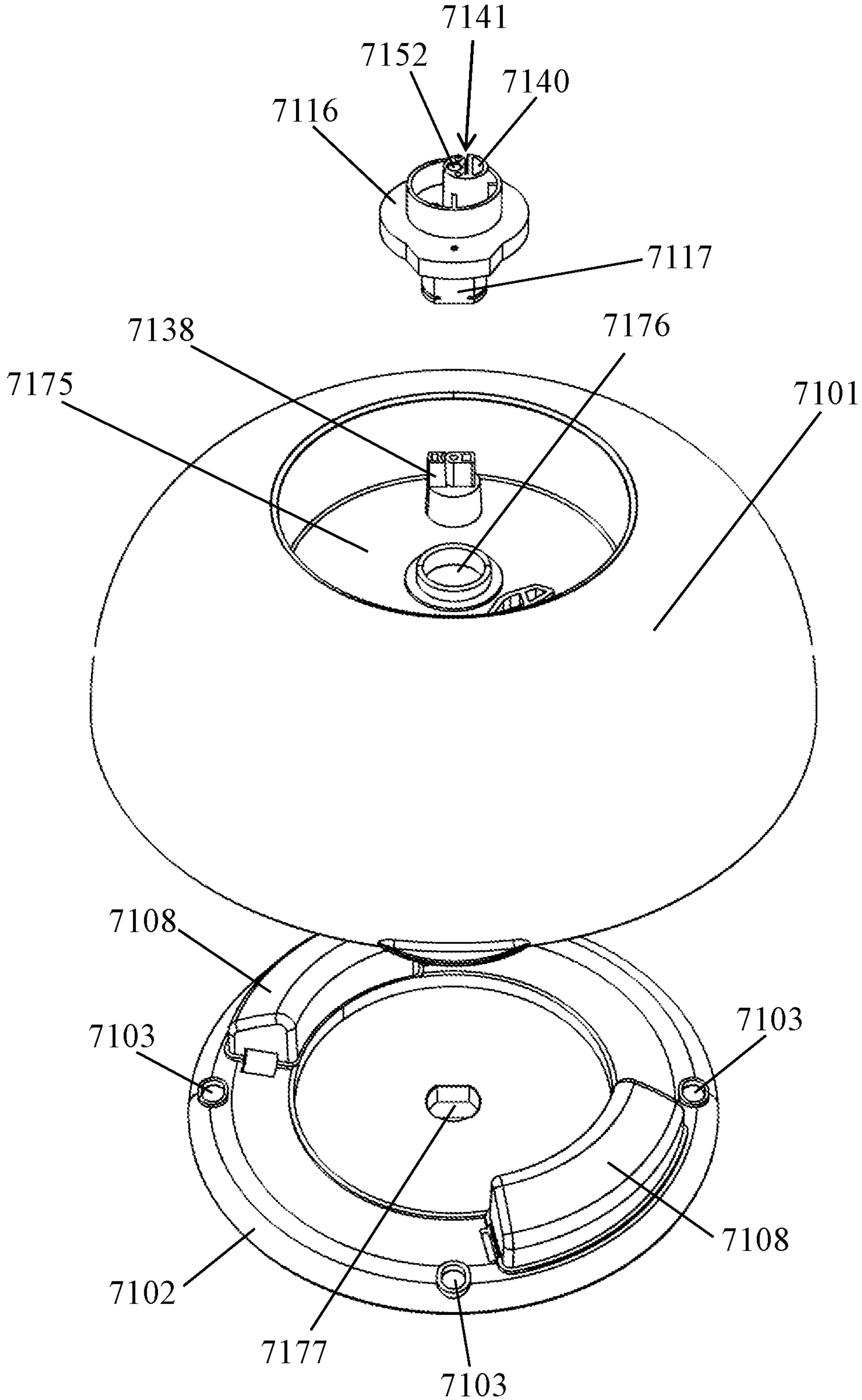
FIG. 21 is an enlarged view of a portion of FIG. 20, according to an aspect of the embodiment.

Referring now to FIG. 21, the axle 7116 has a rotational axis 7152. At this rotational axis 7152 there can be a center bore to receive the vertical rod 7188 of the turn knob 7105 (see FIG. 23). The axle 7116 can have a half-circular bore 7140 to receive a half-circular cylinder 7189 of the turn knob 7105 (see FIG. 23). The vertical rod 7188 and half-circular cylinder 7189 can function to mechanically engage the axle 7116 so that when a user turns the turn knob 7105, the vertical rod 7188 and the half-circular cylinder 7189 (both of which can be integral with the turn knob 7105) could in turn rotate the axle 7116. Cross-sectional shapes other than half-circular are also contemplated. On top of the axle 7116 there can be a slit 7141 to receive a center terminal end 7194 of the torsion spring 7115 (see FIG. 22). How the torsion spring 7115 functions will be described in more details later.

The axle 7116 is disposed through the floor 7175 of the chamber, and the bottom end 7117 of the axis extends through the center hole 7176 of the floor 7175 and through the receiving bore 7177 of the rotator 7102. The bottom end 7117 can have a corresponding cross-sectional shape to the shape of the receiving bore 7177 so that when the axle 7116 rotates, the rotator 7102 also rotates. This bottom end 7117 can be fixed to the receiving bore 7177 via know mechanical fasteners such as a retaining ring.

As described in other embodiments above, the rotator 7102 can also have housings to store deodorizers 7108. And similarly, there can be catchers 7103 disposed on the rotator 7102 for purposes described above.

On the floor 7175 of the chamber there can be a side post 7138 fixed to the floor 7175. The side post 7138 engages with the peripheral terminal end 7195 of the torsion spring to anchor the peripheral terminal end 7195 in place.

Figure 22:
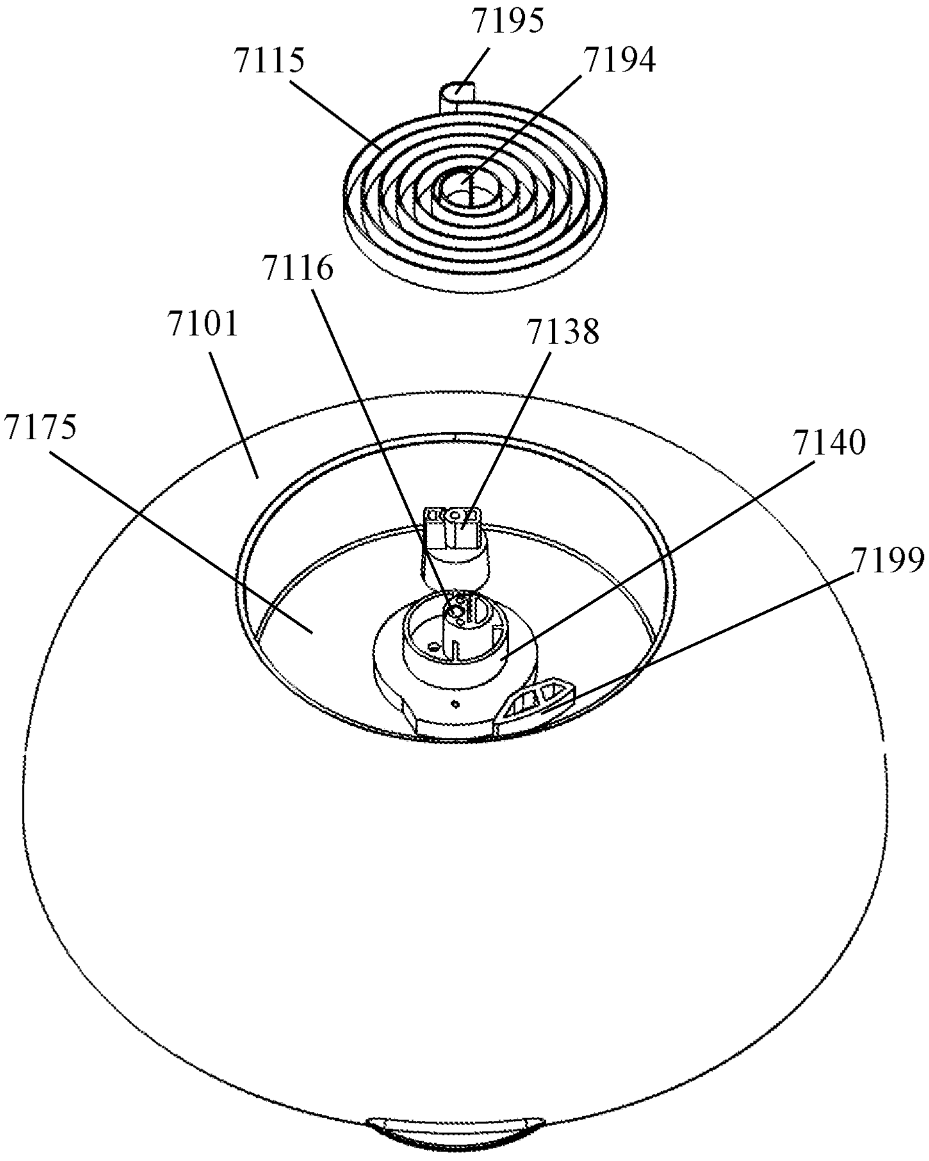
FIG. 22 is an enlarged view of a portion of FIG. 20, according to an aspect of the embodiment.

Turning now to FIG. 22, the torsion spring 7115 has its peripheral terminal end 7195 anchored to the side post 7138, and its center terminal end 7194 can move along when the axle 7116 rotates. In this way, the axle 7116 is directly biased by the torsion spring 7115 into one direction. The axle 7116 can have a ramp configuration that engages with a stopper 7199 so as to limit the range of its rotational movement. The stopper 7199 is fixed to the floor 7175.

Figure 23:
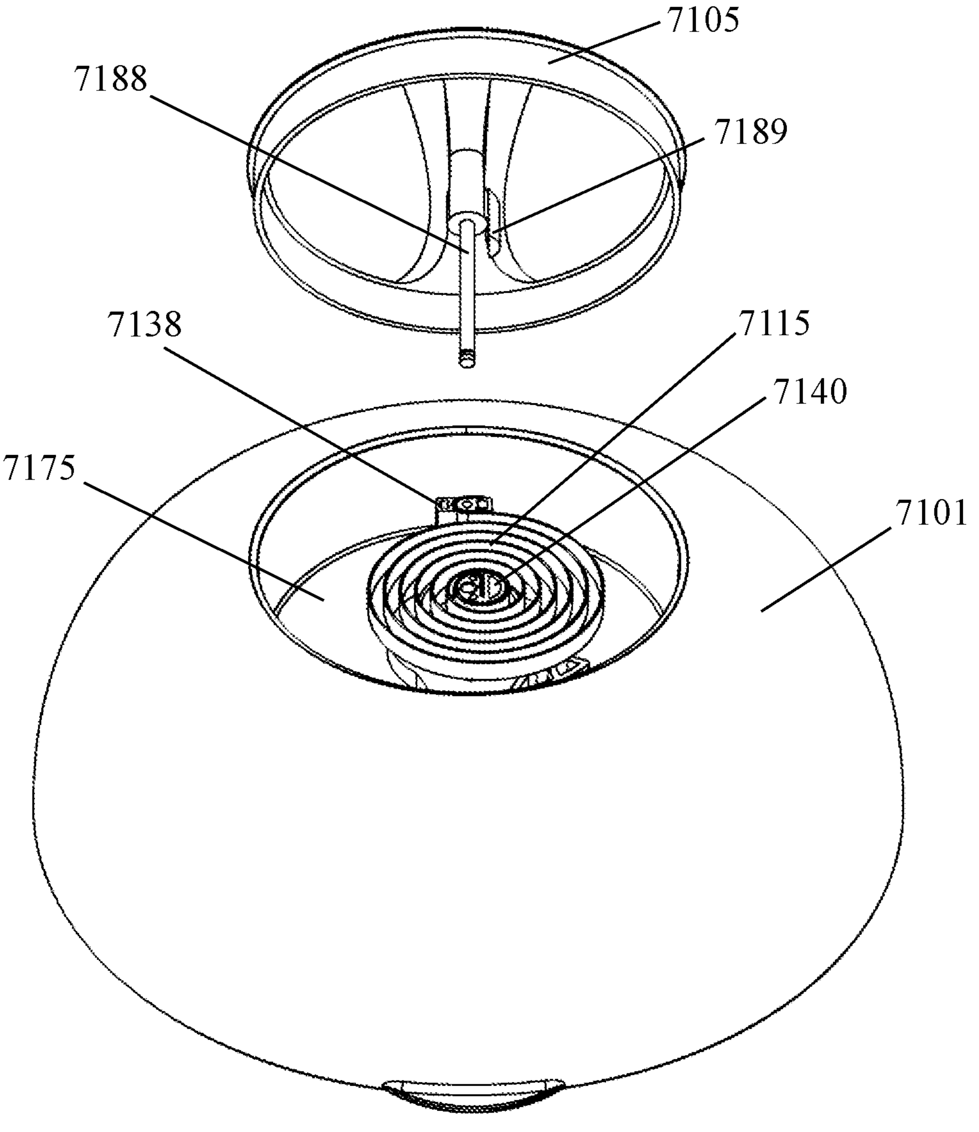
FIG. 23 is an enlarged view of a portion of FIG. 20, according to an aspect of the embodiment.

FIG. 23 illustrates the torsion 7115 being mechanically engaged with the axle 7116.

FIGS. 24-36 illustrate yet another embodiment of waste pail 1 using a pull-string handle 8105 to actuate a rotator 8102 (see FIG. 26) disposed on the underside of the lid casing 8101. Here, no gears are necessarily present. In FIGS. 24-36, only the top drum 2 and its inner components are illustrated. When fully assembled, this embodiment could have an exterior appearance like that shown in FIGS. 1 and 2, except the turn knob 105 is replaced with a handle 8105. When the top lid 8101 is pivoted open, it could have the appearance as that shown in FIGS. 3-12. One of ordinary skill in the art would immediately recognize that the top drum 2 of FIGS. 24-36 as well as its inner components can interchange with any of the other disclosed components disclosed elsewhere in this application relative to top drum 2.

Figure 24:
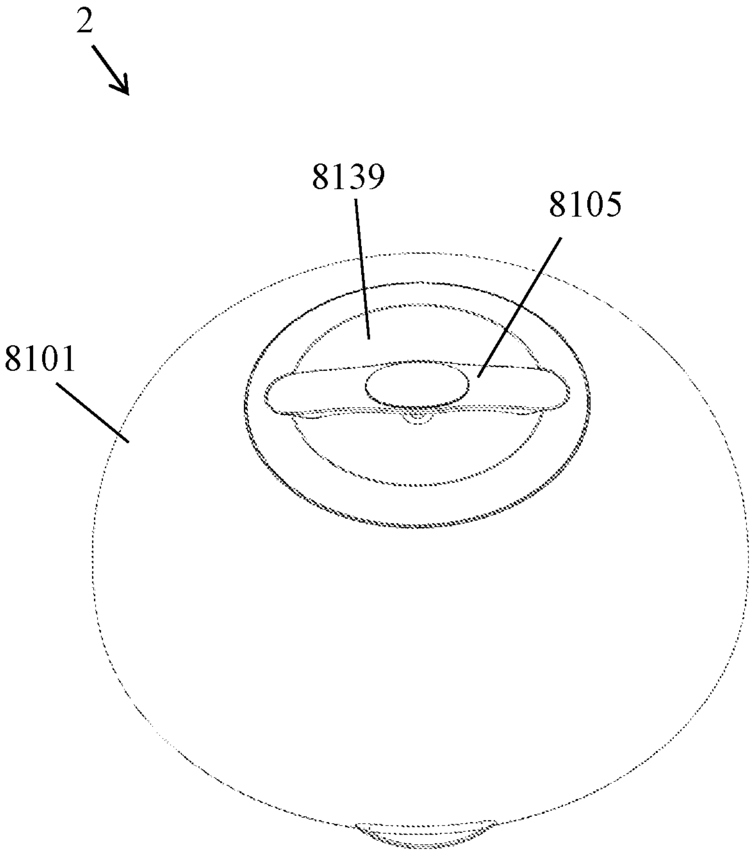
FIG. 24 is a perspective view of another embodiment of the top drum, according to an aspect of the embodiments.

Referring now to FIG. 24, this embodiment of the top drum 2 can include a lid casing 8101 having a generally dome shape.

Figure 25:
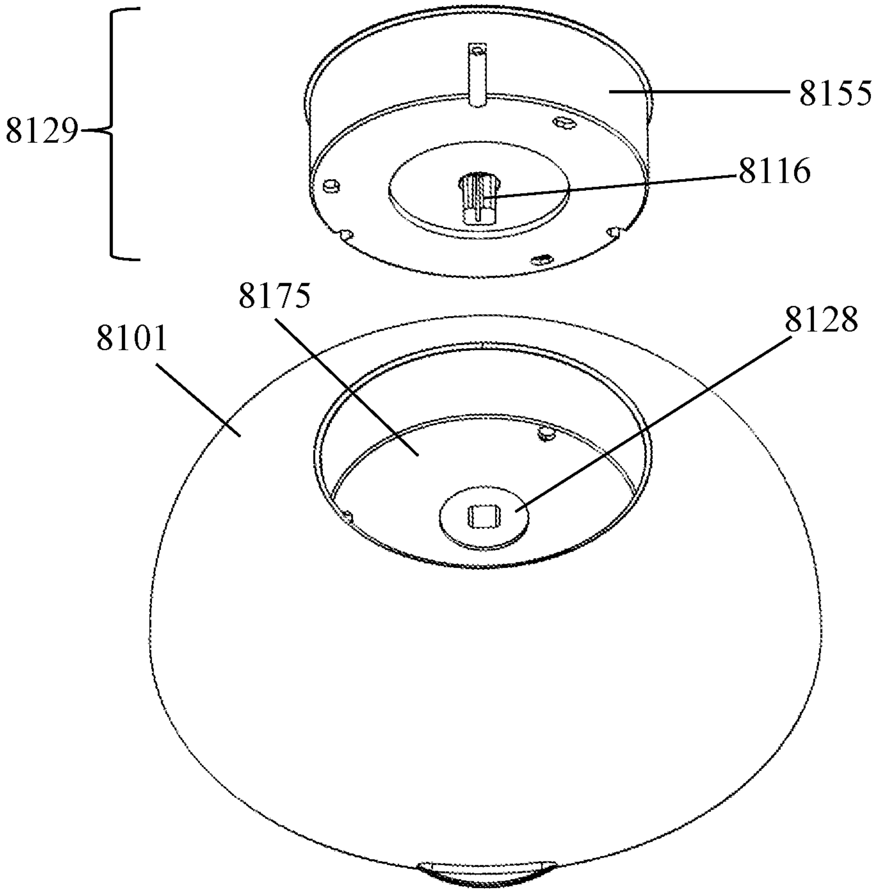
FIG. 25 is a perspective view of the top drum of FIG. 24 with the module removed, according to an aspect of the embodiments.

Referring now to FIG. 25, on top of the lid casing 8101 there can be chamber having a floor 8175. This floor 8175 can be integral with the lid casing 8101 and cannot move relative to the lid casing 8101. There can be a center hole 8176 (see FIG. 26) through which an axle extender 8128 can be inserted therethrough. In FIG. 25, the axle extender 8128 is shown already inserted into the center hole 8176. The axle extender 8128 can have a receiving bore having a cross-sectional shape that corresponds with the cross-sectional shape of axle 8116 in order to matingly receive the axle 8116 therein. The axle 8116 mechanically engages with the axle extender 8128 such that when the axle 8116 turns, the axle extender 8128 also turns within the center hole 8176.

In some embodiments, the axle extender 8128 can be an integral part of the axle 8116 and does not need to be a separate piece.

The module 8129 houses various moving parts, which will be described in more details below. The module 8129 can be fastened to the lid casing 8101 by any known fastening methods and fasteners, such as screws. The module 8129 does not need to be removed from the lid casing 8101 during the normal operation of the waste disposal pail 1.

As will be described in more details later, the axle 8116 is driven by the pull-string handle 8105 such that when a user manually pulls the handle 8105, the axle 8116 would rotate which indirectly rotates the rotator 8102.

Figure 26:
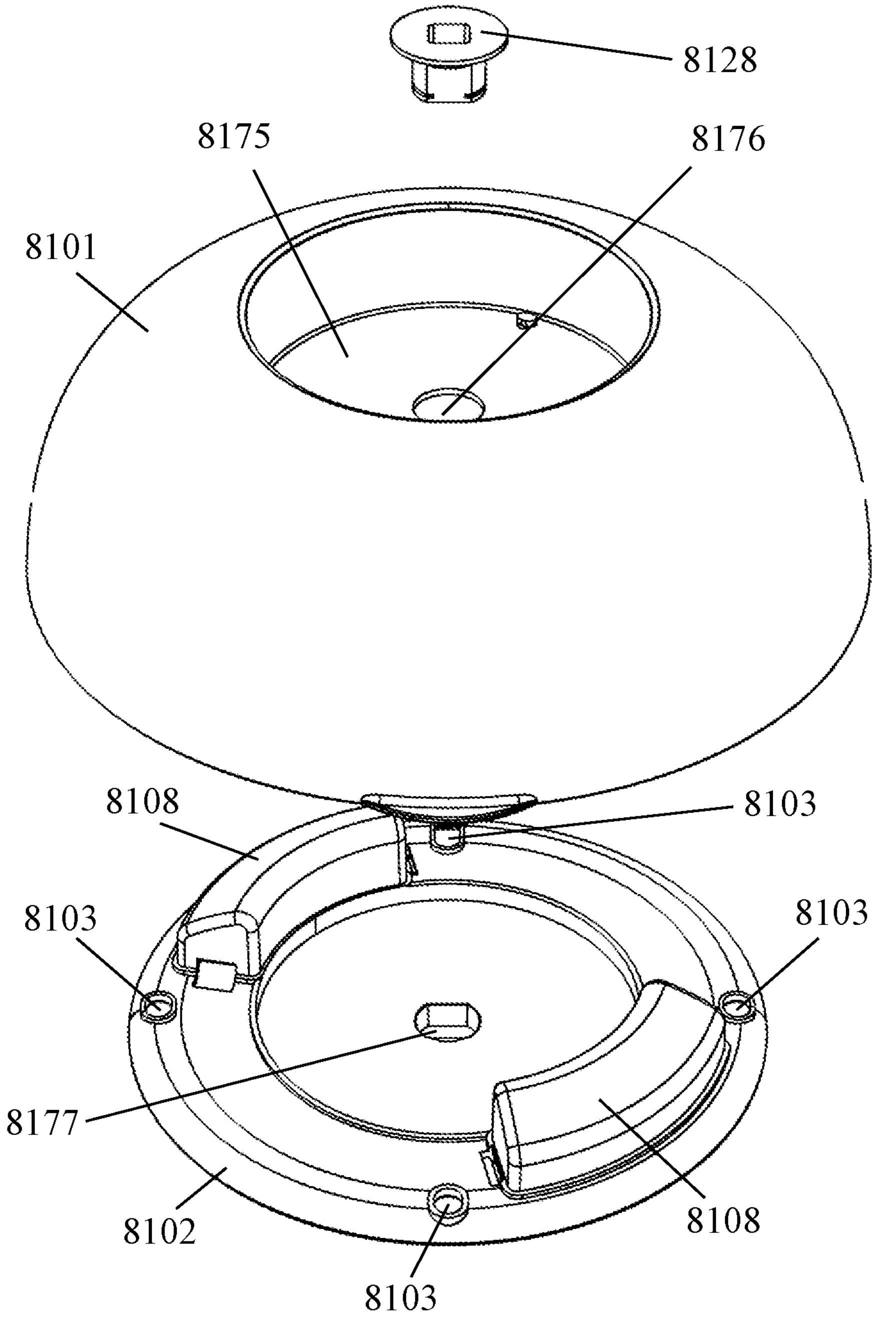
FIG. 26 is a perspective view of the top drum of FIG. 24 with the module and rotator removed, according to an aspect of the embodiments.

Referring now to FIG. 26, the axle extender 8128 has a bottom portion with a corresponding cross-sectional shape to the shape of the receiving bore 8177 on the rotator 8102 so that when the axle extender 8128 rotates, the rotator 8102 also rotates. This axle extender 8128 can be fixed to the receiving bore 8177 via know mechanical fasteners such as a retaining ring.

As described in other embodiments above, the rotator 8102 can also have housings to store deodorizers 8108. And similarly, there can be catchers 8103 disposed on the rotator 8102 for purposes described above.

Figure 27:
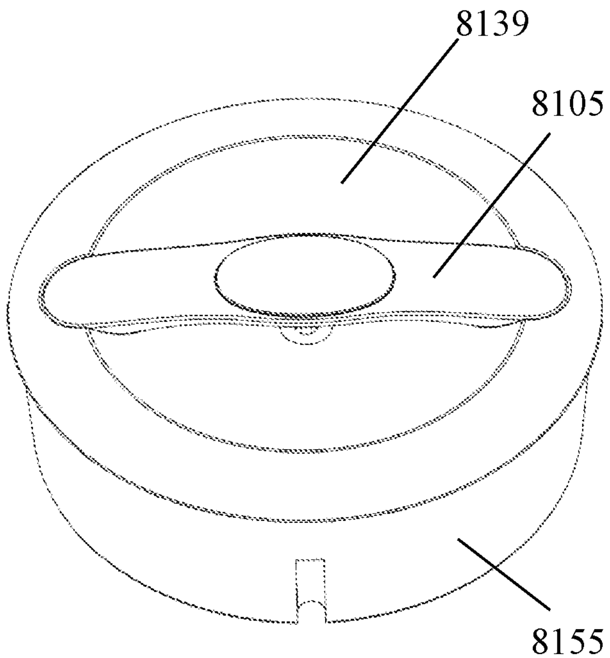
FIG. 27 is a perspective view of the module of FIG. 25, according to an aspect of the embodiments.

Referring now to FIG. 27, the handle 8105 rests on the top of the module 8129, and the top of the module can have a bowl-shape space 8139 allowing a user to insert his/her fingers therein to grasp the handle 8105.

Figure 28:
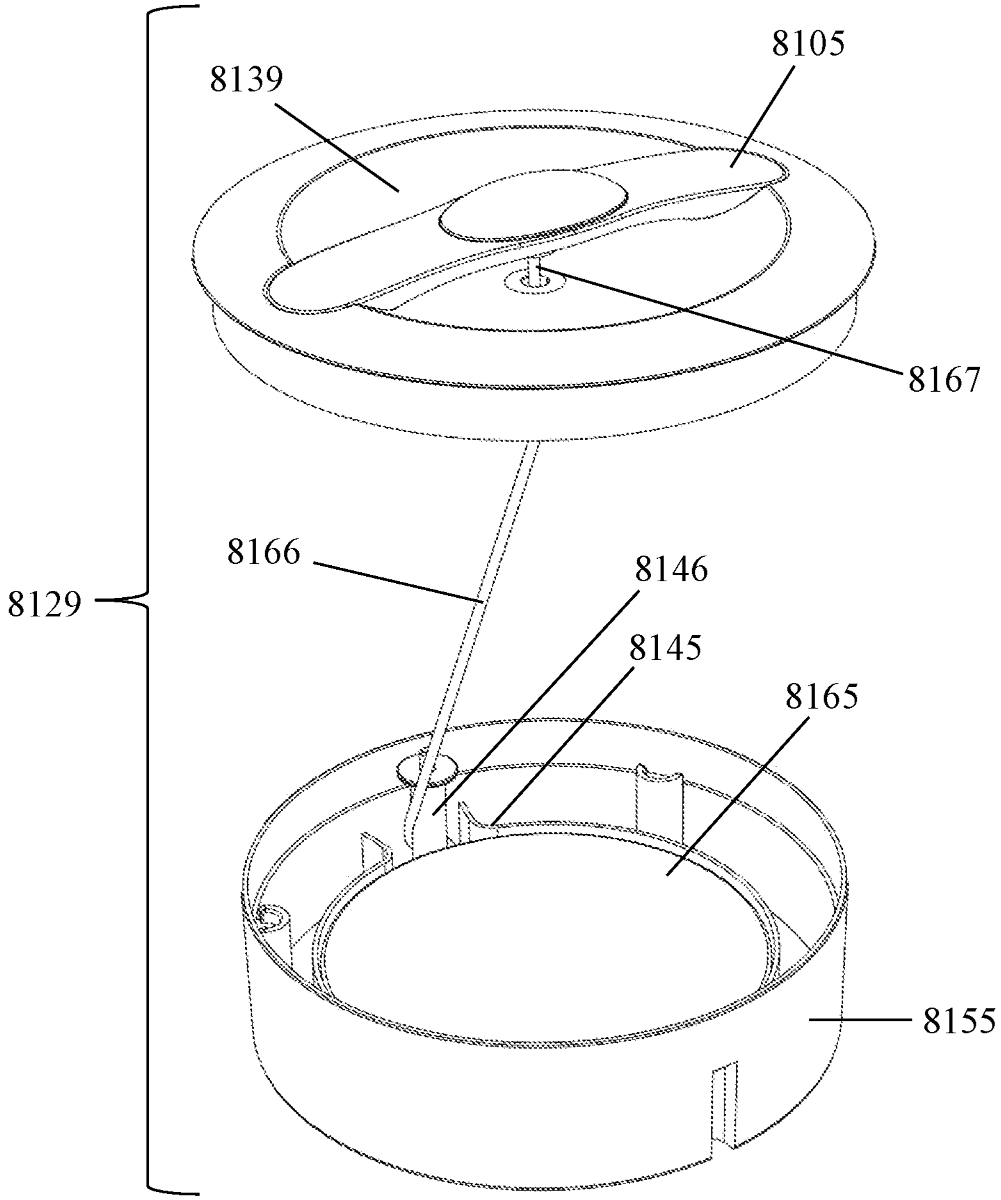
FIG. 28 is an exploded view of the module of FIG. 26, according to an aspect of the embodiments.

Referring now to FIG. 28, the handle 8105 is attached to the handle end 8167 of the pull-string 8166. In some embodiments, pull-string 8166 can extend through a bore at the bottom of the bowl-shaped space 8139, but the disclosure is not limited thereto. Pull-string 8166 can wrap around a pillar 8146 and be redirected into a circular track 8165. Circular track 8165 is coupled to the axle 8116 such that when the circular track 8165 rotates, the axle 8116 also rotates.

There can be a circular first retaining wall 8145 that is part of the module housing 8155. The circular first retaining wall 8145 keeps the circular track 8165 centered within the module housing 8155.

Figure 29:
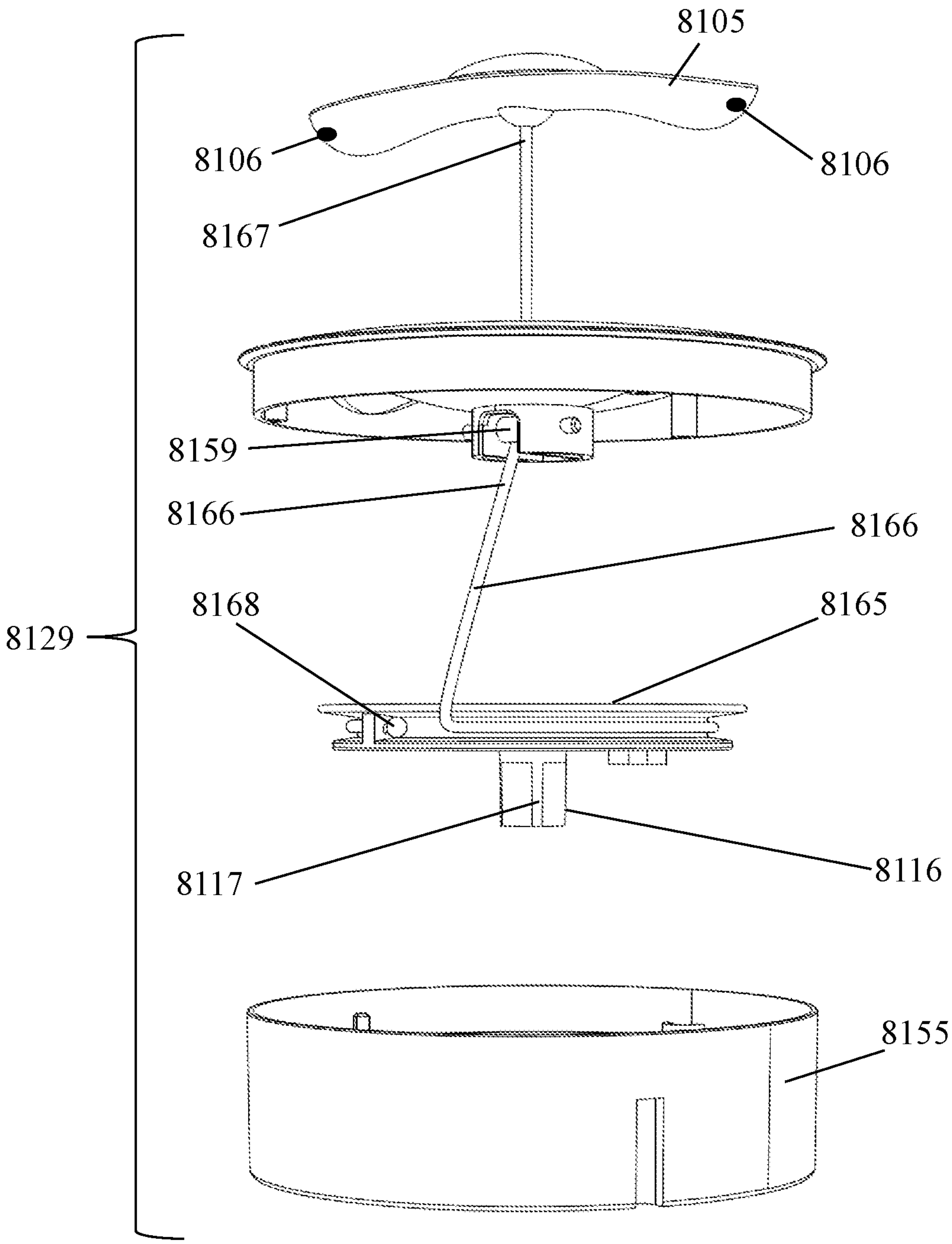
FIG. 29 is an exploded view of the module of FIG. 26, according to an aspect of the embodiments.
Figure 30:
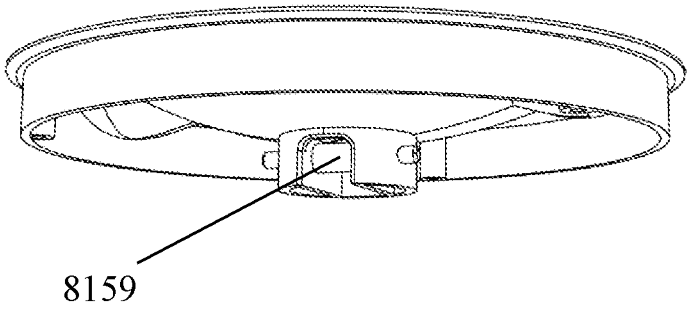
FIG. 30 illustrates a pully bar within the module housing, according to an aspect of the embodiments.
Figure 31:
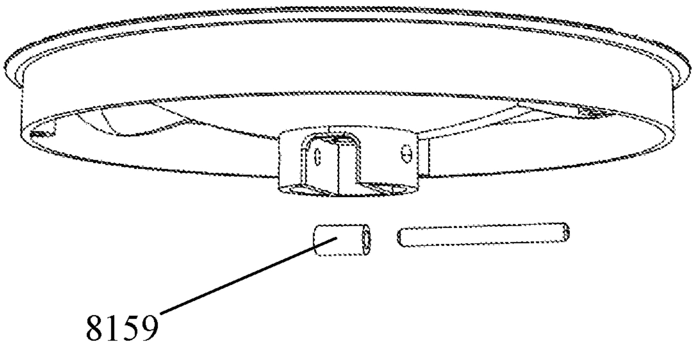
FIG. 31 illustrates the pulley bar of FIG. 30 being disassembled, according to an aspect of the embodiments.
Figure 32:
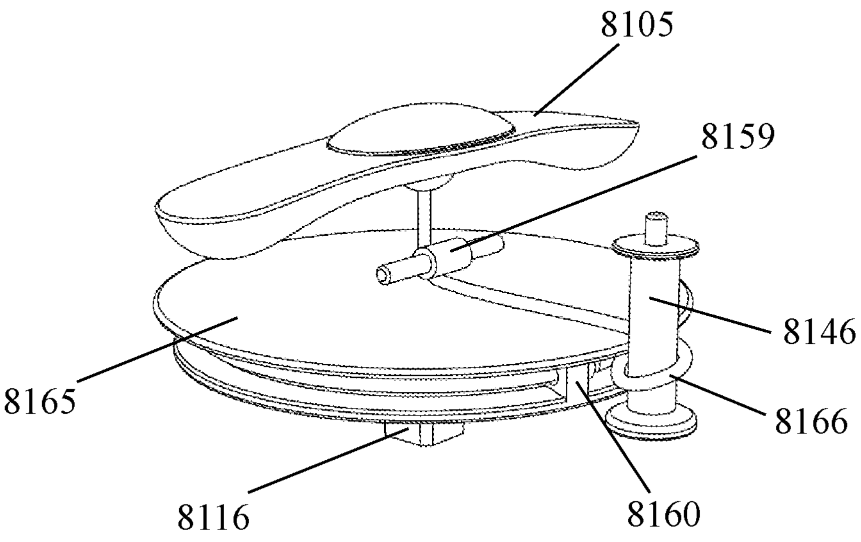
FIG. 32 illustrates how the pull-string is wound around the circular track, according to an aspect of the embodiments.
Figure 36:
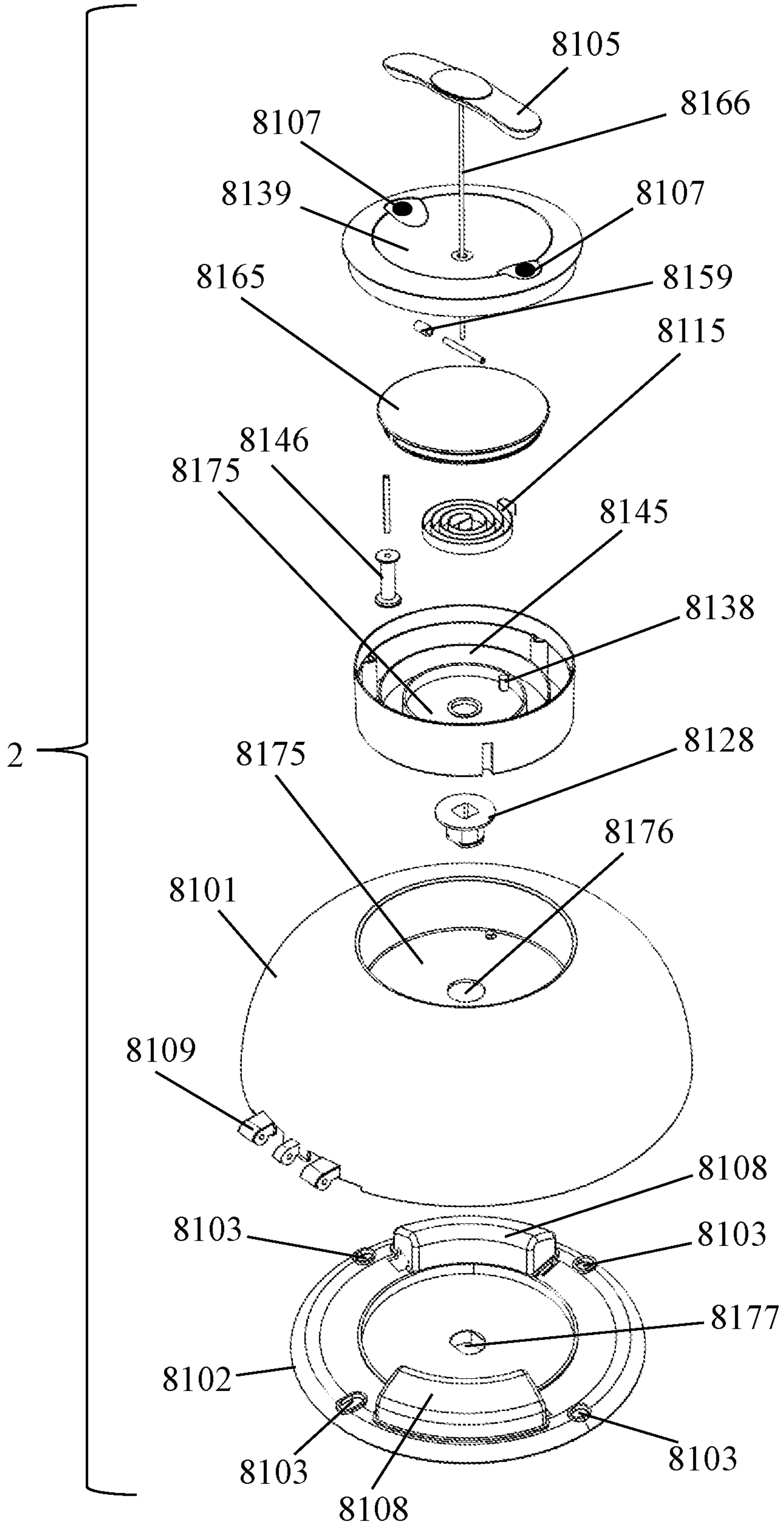
FIG. 36 is an exploded view of the top drum of FIG. 24, according to an aspect of the embodiments.

Referring now to FIG. 29, there can magnets 8106 disposed on the terminal ends of the handle 8105 so that when a user allows the pull-string 8166 to retract, the magnets 8106 can adhere to metal pieces 8107 disposed on the handle-receiving concave surfaces of the module 8129 (see FIG. 36). In another embodiment, the metal pieces 8107 may be placed on the underside of the handle-receiving concave surfaces so that the metal pieces 8107 are hidden from view.

As shown in FIGS. 29-32, there can be a pulley bar 8159 to provide a smooth change-of-direction as the pull-string 8166 is directed towards the pillar 8146 (see FIG. 28).

Returning to FIG. 29, the circular track 8165 can have a generally disc-shape with a grove on its peripheral edge to receive the pull-string 8166. Pull-string 8166 wraps around the groove and the anchor end 8168 of the pull-string 8166 is fixed to a restrictor 8160, which is part of the circular track 8165. In one embodiment, the majority length of the pull-string 8166 can be wound around the circular track 8165 at rest. When the handle 8105 is pulled away from the module housing 8155, the anchor end 8168 of the pull-string 8166 acts on the restrictor 8160 and causes the circular track 8165 to rotate. In turn, the axle 8116 also rotates.

Figure 33:
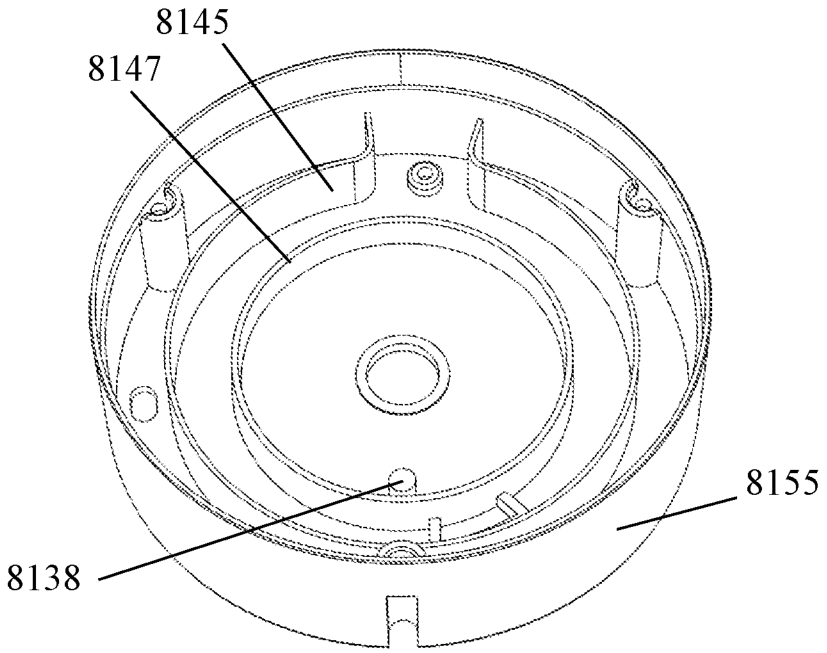
FIG. 33 is a perspective view of the module housing, according to an aspect of the embodiments.
Figure 34:
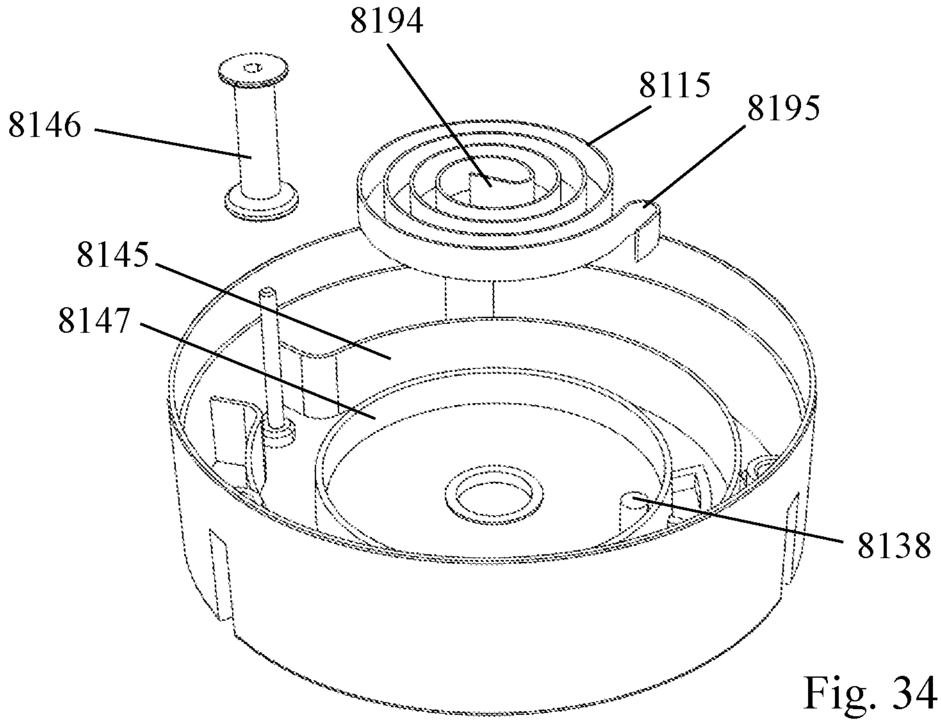
FIG. 34 is an exploded view of the module housing with a torsion spring, according to an aspect of the embodiments.
Figure 35:
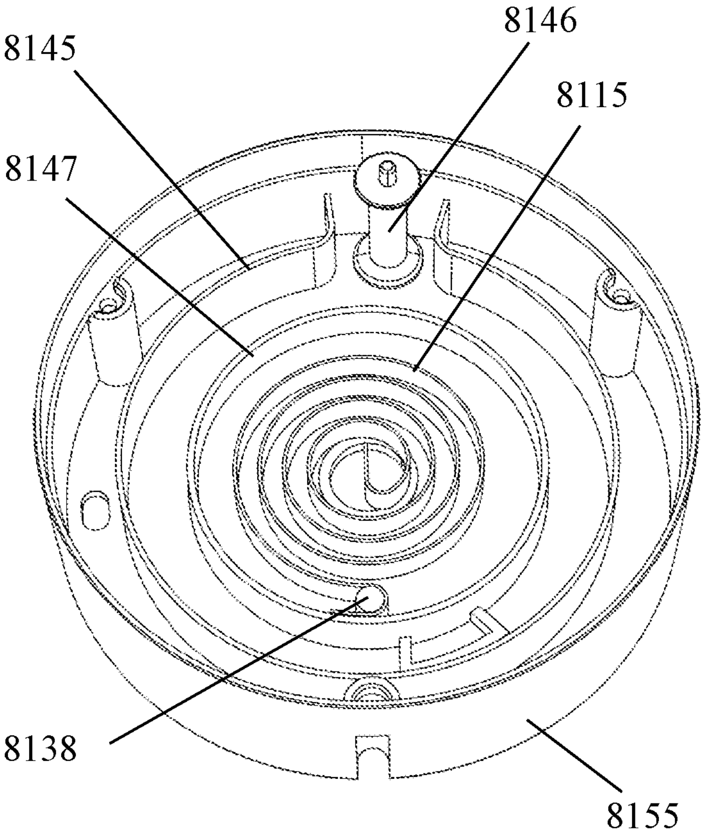
FIG. 35 is a perspective view of the module housing with the torsion spring in place, according to an aspect of the embodiments.

Referring now to FIGS. 33-35, there can be a torsion spring 8115 disposed within the confines of second retaining wall 8147. The second retaining wall 8147 is a part of the module housing 8155 and remains stationary during operation. This torsion spring 8115 has a center terminal end 8194 that can be received with a slit 8117 (see FIG. 29) of the axle 8116. The peripheral terminal end 8195 of the torsion spring is anchored at the side post 8138, which can be part of the module housing 8155. The side post 8138 remains stationary during operation. In this way, the torsion spring 8115 biases the axle 8116 in one direction. When the handle 8105 is pulled, the axle 8116 rotates in the opposite direction.

FIG. 36 provides an overview of the various parts discussed above in an exploded view.

Additionally, while the operations and/or methods may be depicted in the drawings in a particular order, this should not be understood as requiring that such operations be performed in the particular order shown or in sequential order, or that all illustrated operations and/or method steps be performed, to achieve desirable results. In certain circumstances, multitasking and parallel processing may be advantageous.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a waste pail have been disclosed. It should be apparent, however, to those skilled in the art that many more modifications besides those already described are possible without departing from the disclosed concepts herein. The disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

What is claimed is:

1. A waste disposal pail comprising:

a top drum having a lid casing and a rotator rotatably disposed under the lid casing;

a manual actuator disposed on a top side of the lid casing to drive the rotator;

a bottom drum having a top rim to define a top opening, and an enclosure to receive a waste bag;

an outer collar coupled to said top rim;

an inner collar coaxially and rotatably coupled to the outer collar;

a center opening disposed on the inner collar;

at least one catcher disposed on the rotator;

wherein the at least one catcher directly or indirectly engages with the inner collar such that when the rotator rotates, the inner collar also rotates;

a spring disposed in the top drum to bias the rotator in a first position, which in turn biases the inner collar in a primed position;

wherein a top rim of the waste bag is attached to the inner collar and a tether of the waste bag is attached to the bottom drum;

an axis coupled to the rotator, the axis having a circular track;

wherein the manual actuator is a pull-string having a handle end and an anchor end, and a majority length of the pull-string is wound around the circular track, wherein when the handle end is pulled away from the lid casing, the majority length of the pull-string unwinds thereby causing the rotator to rotate.

2. The waste disposal pail as recited in claim 1, wherein the axis is directly biased by the spring, and the spring is a torsion spring having one terminal end anchored to the axis and another terminal end anchored to the lid casing.

3. The waste disposal pail as recited in claim 1 further comprising a handle attached to the handle end, and a magnet disposed on the handle to keep the handle aligned to the lid casing at rest.

4. The waste disposal pail as recited in claim 1, wherein the at least one catcher indirectly engages with the collar via a lid insert which forms a funnel above a rim of the waste bag.

5. The waste disposal pail as recited in claim 1, wherein the lid casing is pivotably coupled to the bottom drum.

6. The waste disposal pail as recited in claim 1 further comprising a driving gear and a secondary gear disposed within the lid casing, wherein the driving gear directly or indirectly drives the secondary gear, and the secondary gear is co-axial with the rotator, and wherein when the actuator moves, the actuator causes the driving gear to rotate.

7. The waste disposal pail as recited in claim 1, wherein a top portion of the bottom drum can be removed from a bottom portion of the bottom drum to allow for removal of the waste bag without having to:

1) Pull the waste bag through the collar, or
2) pull the waste bag through the top rim of the bottom drum.

8. The waste disposal pail as recited in claim 1 further comprising a compartment disposed on the rotator to house a deodorizing material.

9. A waste management method to minimize an escape of odor from an inside of a waste pail, the method comprising:

placing a waste bag into a bottom drum of the waste pail;

anchoring a top rim of the waste bag to a rotatable inner collar that is rotatably coupled to an outer collar, and the outer collar is coupled to a top rim of the bottom drum;

anchoring a portion of the waste bag via at least one tether to an interior of the bottom drum;

priming the waste bag by rotating the inner collar thereby wrapping the at least one tether around a neck of the waste bag to close off the inside of the waste bag from an ambient environment;

providing a lid casing pivotably coupled to the bottom drum capable of covering over the inner collar; the lid casing having a rotator disposed on an underside of the lid casing, wherein the rotator either directly or indirectly engages with the inner collar to rotate the inner collar when the lid casing is closed over the inner collar;

operating a manual actuator on the lid casing to control a movement of the rotator;

wherein when a user lifts the lid casing to place a waste article into the top opening of the waste bag, the neck of the waste bag remains twisted shut, thereby keeping the inside of the waste bag from being exposed to the ambient environment, and the manual actuator cannot untwist the neck of the waste bag until the lid casing is closed over the inner collar.

10. The method as recited in claim 9 further comprising using a torsion spring anchored inside the lid casing to bias the rotator in one direction.

11. The method as recited in claim 10, wherein the manual actuator is a turn knob, and further comprising turning the turn knob which is directly coupled to the rotator via an axis, and the torsion spring directly biases the axis in one direction.

12. The method as recited in claim 10, wherein the manual actuator is a pull-string, and further comprising pulling the pull-string which is directly coupled to an axis that is coupled to the rotator, and the torsion spring directly biases the axis in one direction.

13. The method as recited in claim 9 further comprising turning a driving gear to directly or indirectly move a secondary gear, which then moves the rotator.

14. The method as recited in claim 9 further comprising biasing the rotator with a spring to keep the neck of the waste bag twisted.

* * * * *